US012683486B2

(12) United States Patent
Sakakibara

(10) Patent No.: US 12,683,486 B2
(45) Date of Patent: Jul. 14, 2026

(54) METHOD FOR CONTROLLING POWER CONVERTER

(71) Applicant: DAIKIN INDUSTRIES, LTD., Osaka (JP)

(72) Inventor: Kenichi Sakakibara, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 144 days.

(21) Appl. No.: 18/857,054

(22) PCT Filed: Apr. 26, 2023

(86) PCT No.: PCT/JP2023/016406
§ 371 (c)(1),
(2) Date: Oct. 15, 2024

(87) PCT Pub. No.: WO2023/214527
PCT Pub. Date: Nov. 9, 2023

(65) Prior Publication Data
US 2026/0189131 A1      Jul. 2, 2026

(30) Foreign Application Priority Data
May 6, 2022      (JP) ................................. 2022-076470

(51) Int. Cl.
*H02M 1/15*      (2006.01)
*H02M 5/458*      (2006.01)

(52) U.S. Cl.
CPC ............. *H02M 1/15* (2013.01); *H02M 5/458* (2013.01)

(58) Field of Classification Search
CPC . H02M 1/14–15; H02M 5/458; H02M 5/4585
See application file for complete search history.

(56) References Cited

U.S. PATENT DOCUMENTS 9,450,502 B2      9/2016  Sakakibara
9,780,683 B2      10/2017  Sakakibara et al.
(Continued)

FOREIGN PATENT DOCUMENTS

JP          5629885 B2      11/2014
JP          5772915 B2      9/2015
(Continued)

OTHER PUBLICATIONS

Extended European Search Report for European Application No. 23799458.7, dated Jun. 12, 2025.
(Continued)

*Primary Examiner* — Fred E Finch, III
(74) *Attorney, Agent, or Firm* — Birch, Stewart, Kolasch & Birch, LLP

(57)      ABSTRACT

One or both of a duty for conducting a switch for intermittently applying a first voltage boosted from a booster to a direct-current link and the first voltage are controlled. When an alternating-current power output from an inverter is equal to or more than a second threshold less than a first threshold, an equivalent direct-current voltage is controlled to be higher than a peak value of a rectified voltage that is rectified by a converter and equal to or less than a first voltage; and when the alternating-current power has a first value more than the first threshold, the equivalent direct-current voltage is higher than the equivalent direct-current voltage when the alternating-current power has a second value more than the second threshold and less than the first threshold.

18 Claims, 14 Drawing Sheets

(56) References Cited

U.S. PATENT DOCUMENTS

| | | | |
|---|---|---|---|
| 10,389,282 B2 | 8/2019 | Tsukii et al. | |
| 10,666,143 B2 | 5/2020 | Sakakibara | |
| 11,437,921 B2 | 9/2022 | Sakakibara | |
| 2016/0248318 A1* | 8/2016 | Ishizeki | H02M 1/4225 |
| 2016/0294300 A1* | 10/2016 | Sakakibara | H02M 1/4225 |
| 2017/0170770 A1* | 6/2017 | Tsukano | H02M 5/4585 |
| 2017/0201186 A1* | 7/2017 | Yuasa | H02M 1/14 |
| 2017/0310235 A1* | 10/2017 | Sakakibara | H02M 1/4208 |
| 2019/0222135 A1* | 7/2019 | Sakakibara | H02M 1/4225 |
| 2020/0106359 A1* | 4/2020 | Sakakibara | H02M 7/48 |
| 2021/0313903 A1 | 10/2021 | Sakakibara | |
| 2022/0224248 A1 | 7/2022 | Sakakibara et al. | |
| 2024/0088702 A1* | 3/2024 | Shirakawa | H01M 10/48 |

FOREIGN PATENT DOCUMENTS

| | | | |
|---|---|---|---|
| JP | 5804167 B2 | 11/2015 | |
| JP | 6418287 B1 | 11/2018 | |
| JP | 6478881 B2 | 3/2019 | |
| JP | 6721097 B2 | 7/2020 | |
| JP | 2021-58002 A | 4/2021 | |

OTHER PUBLICATIONS

International Search Report, issued in PCT/JP2023/016406, PCT/ISA/210, dated Jun. 27, 2023.
Yoshioka et al., "The Latest Trends on EMC Standards for Power Converters", the 2021 National Meeting of the Institude of Electrical Engineers of Japan, S12-7, total 10 pages.

* cited by examiner

F I G. 2
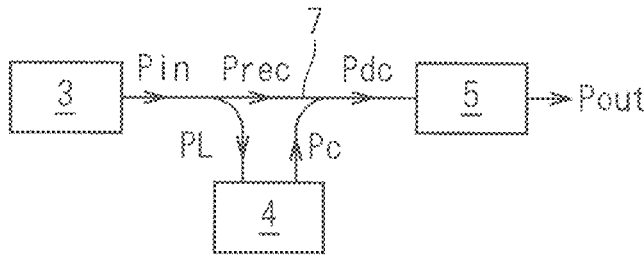
F I G. 3
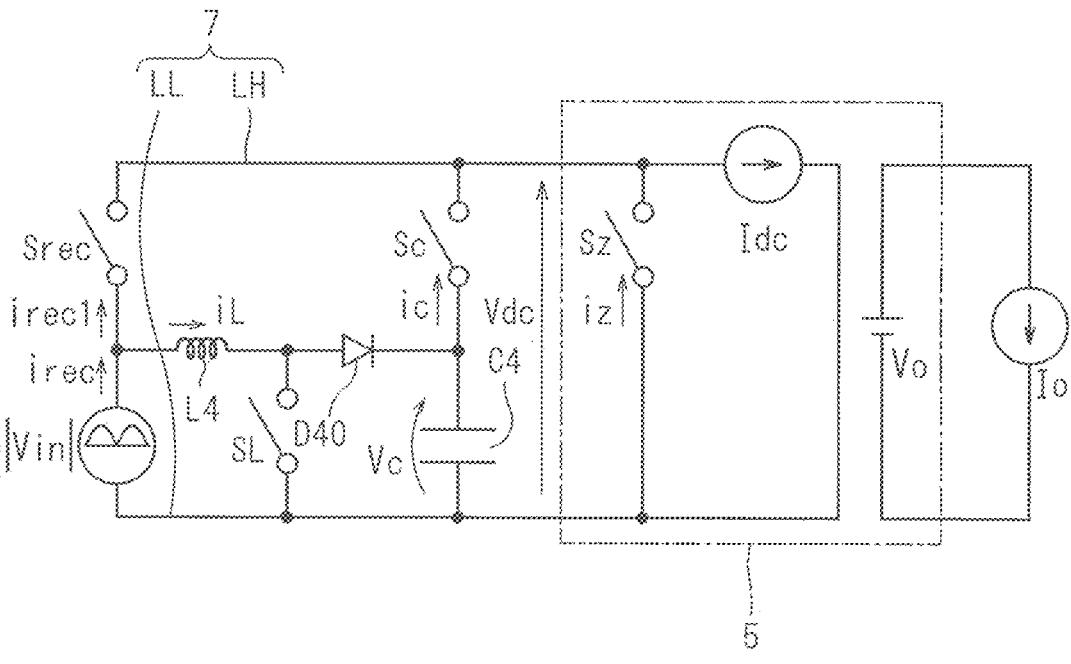

F I G . 4
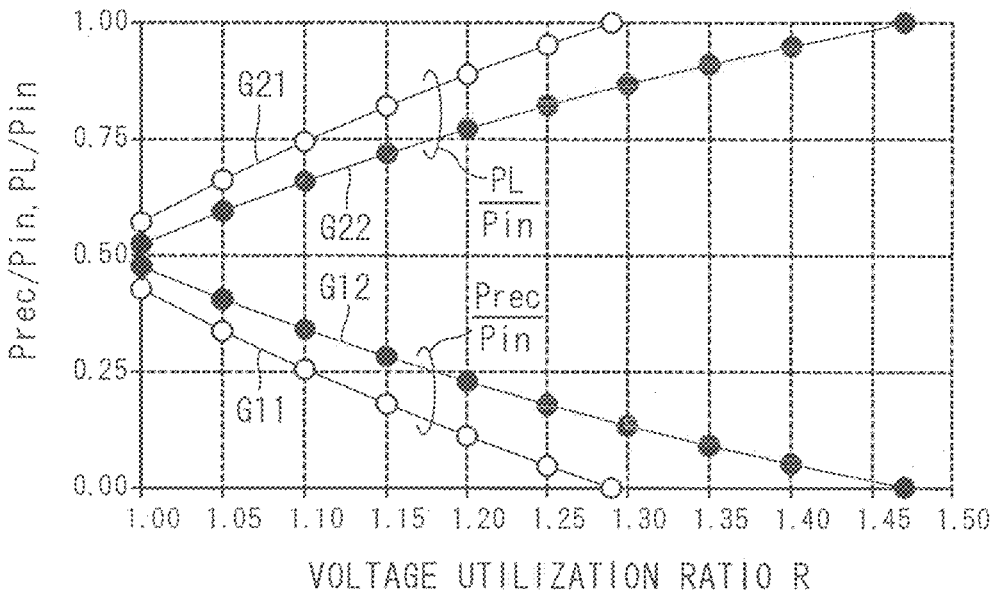
F I G . 5
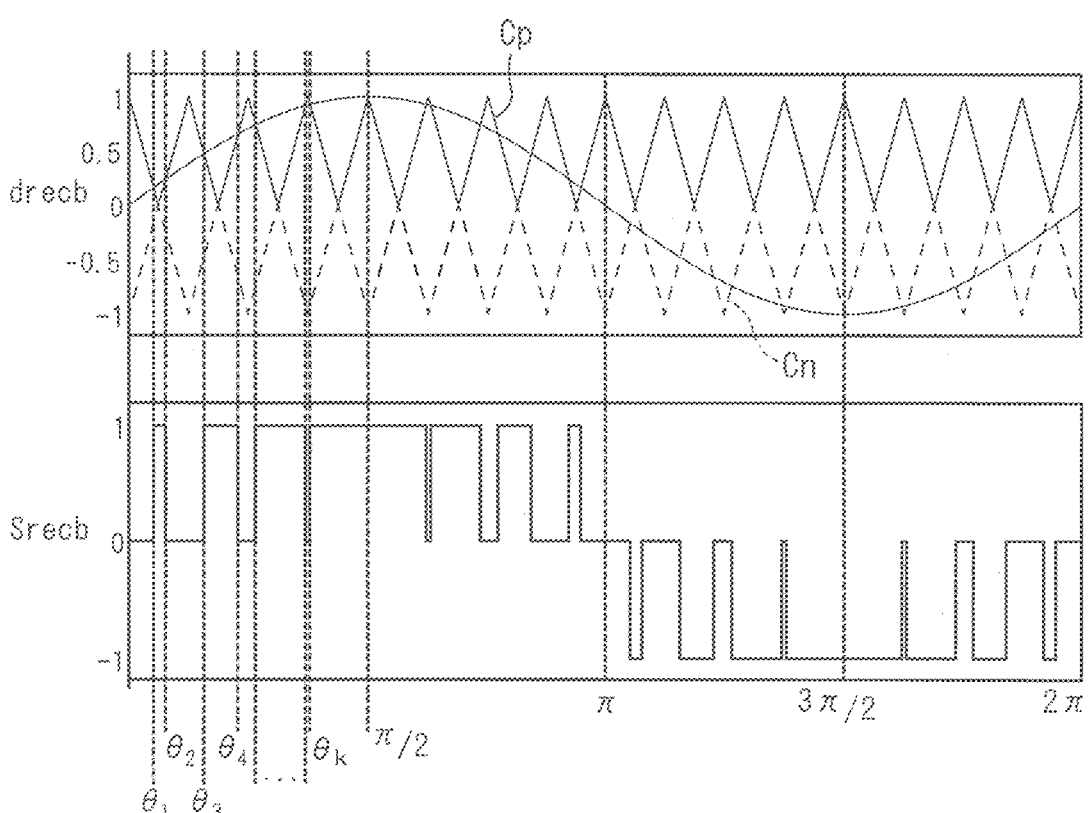

F I G. 6
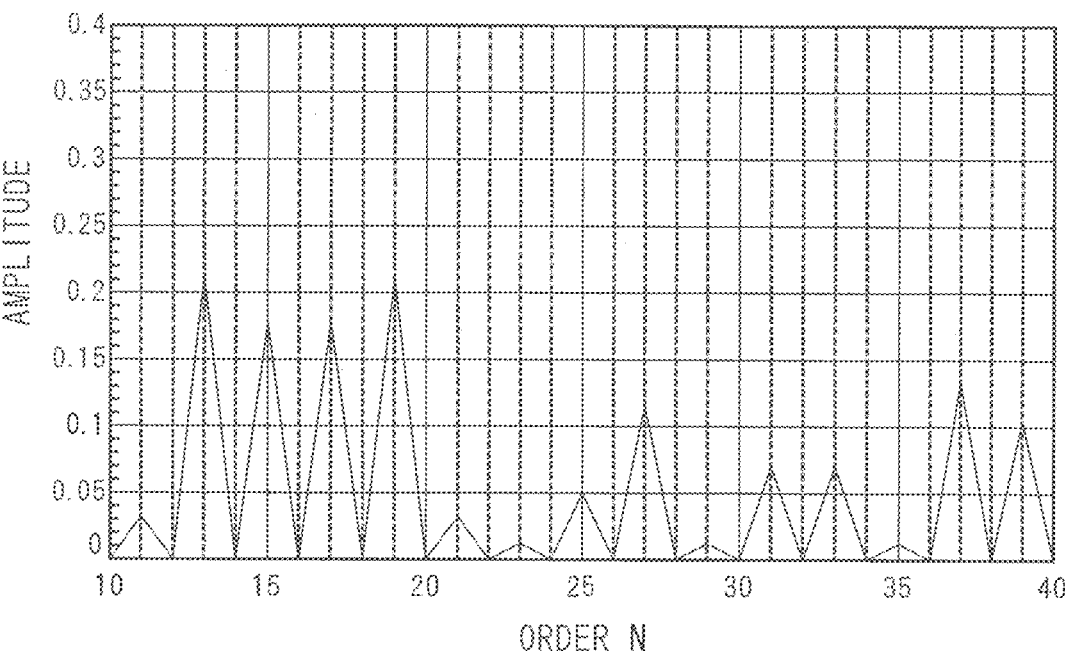
F I G. 7
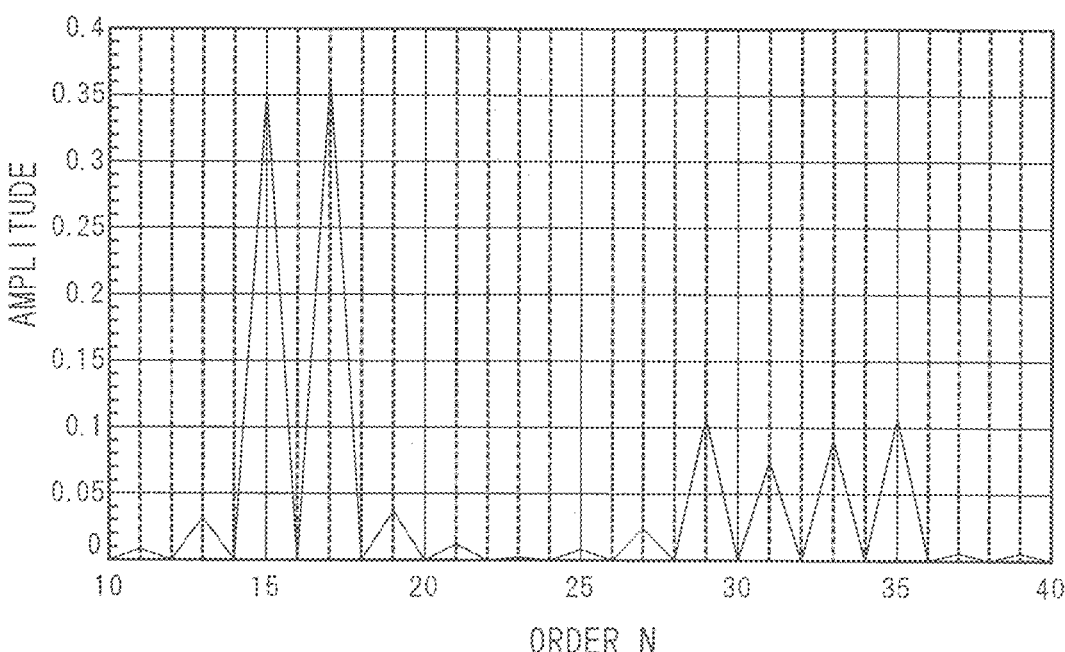

F I G. 8
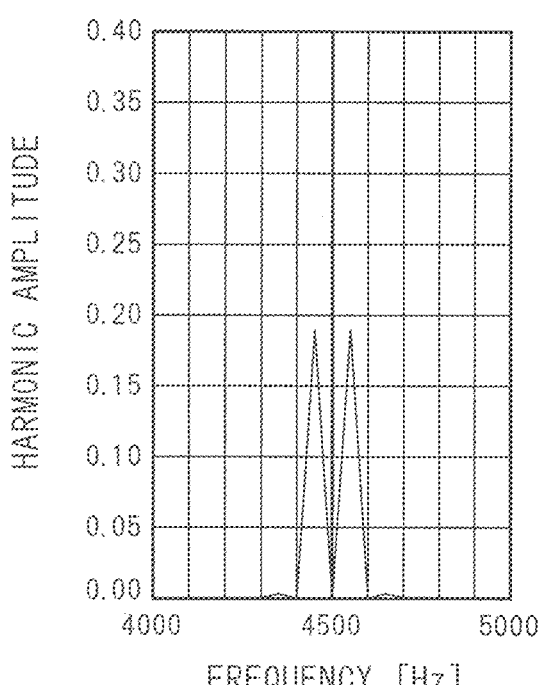
F I G. 9
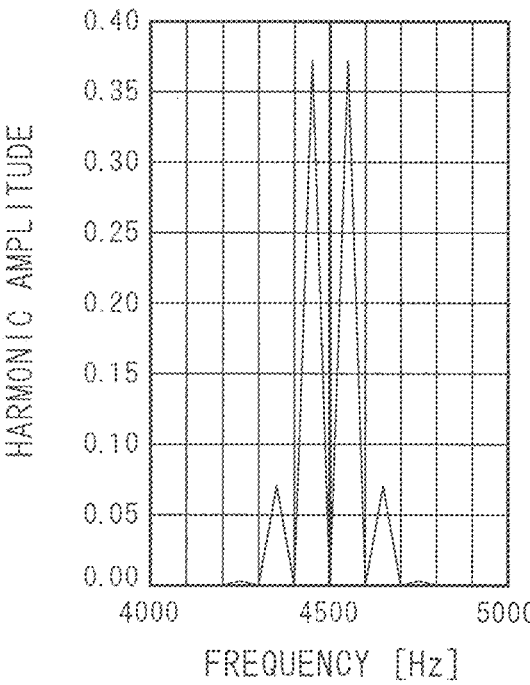

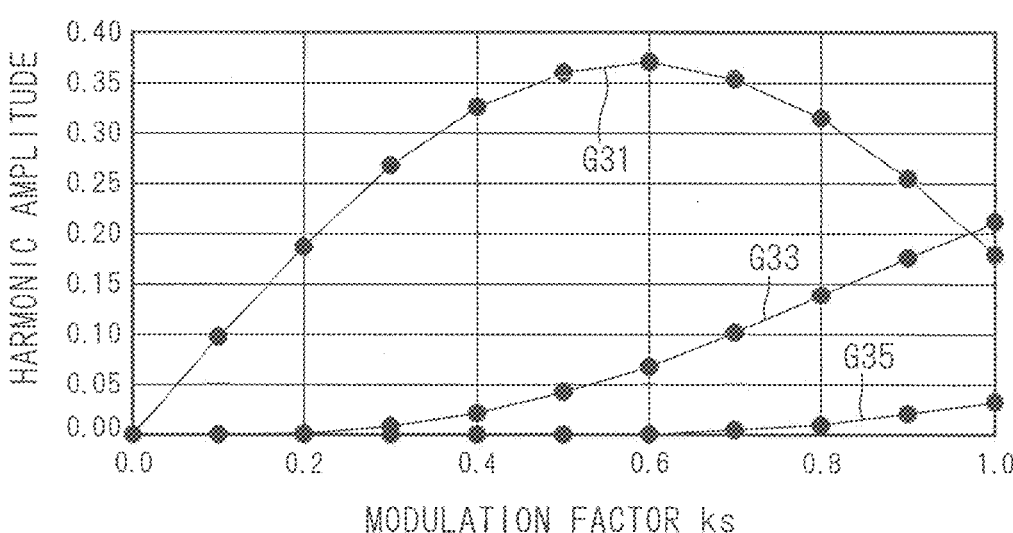
F I G. 1 0
F I G. 1 1

F I G . 1 2
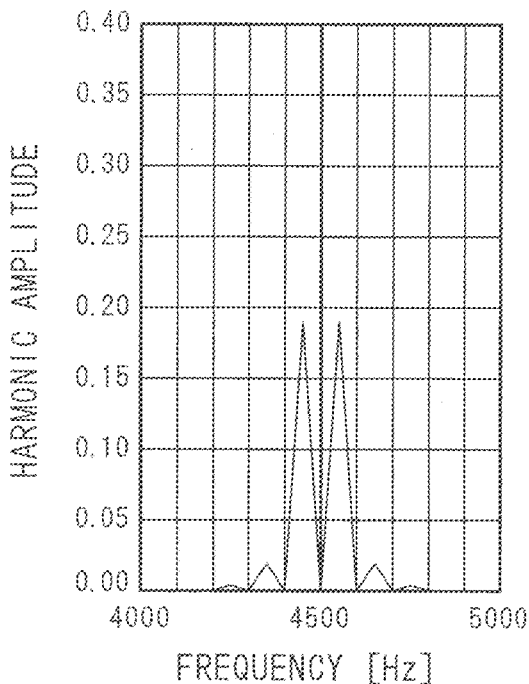
F I G . 1 3
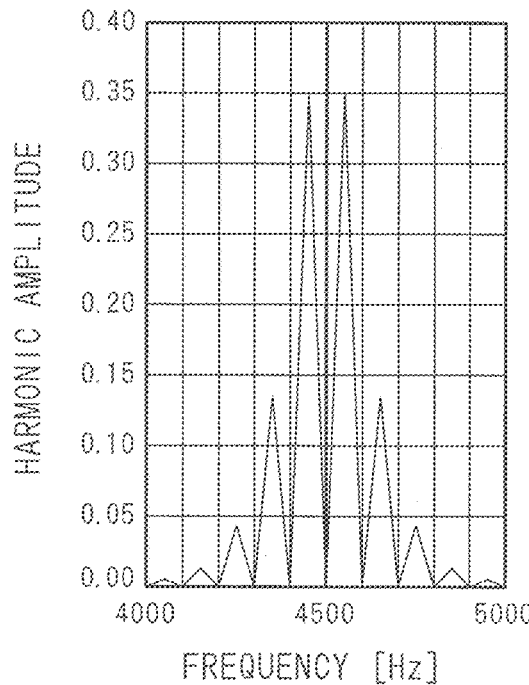

F I G . 1 4
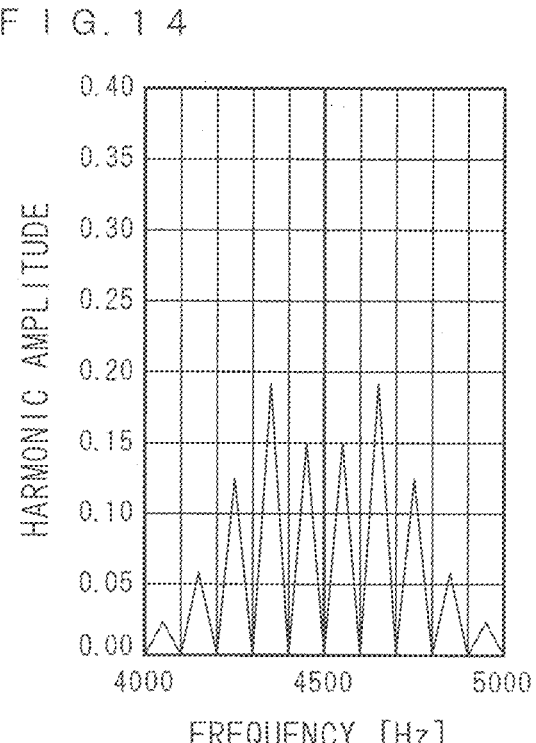
F I G . 1 5
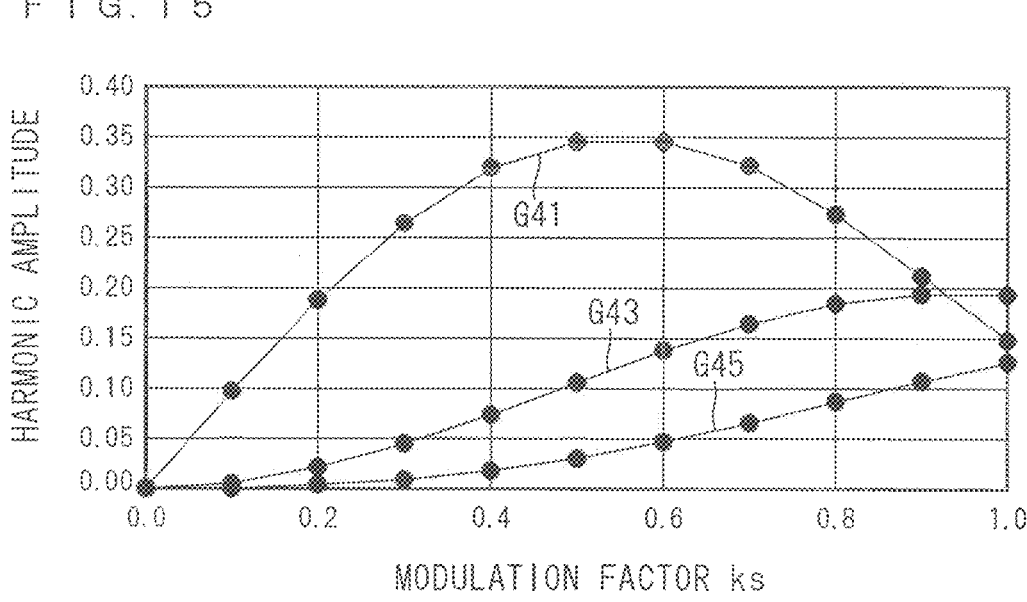

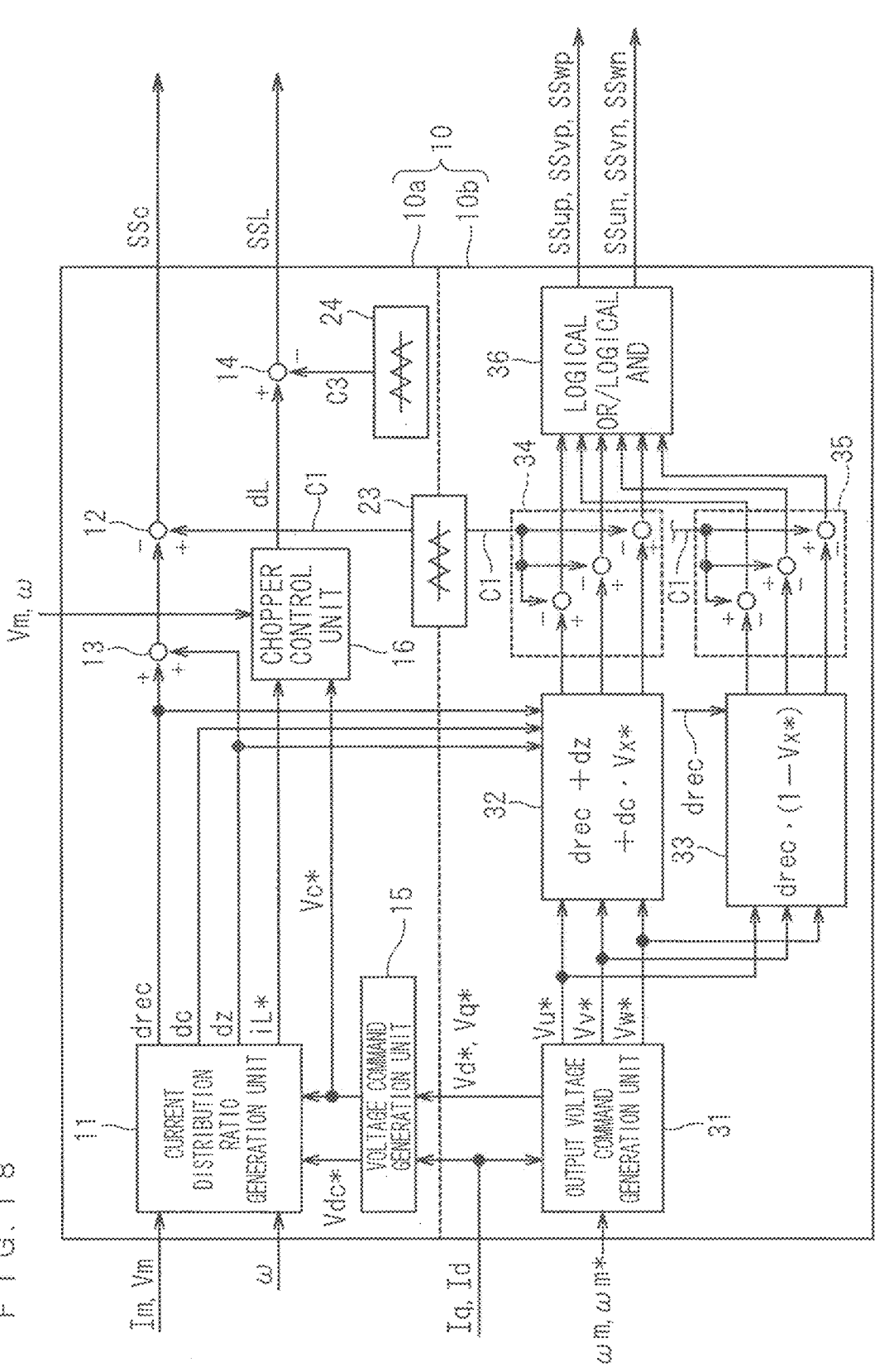
F I G. 1 8

F I G . 2 0
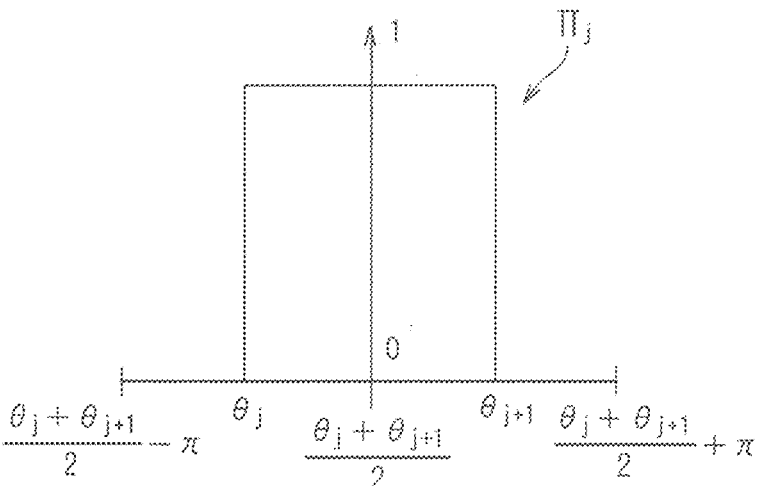
F I G . 2 1
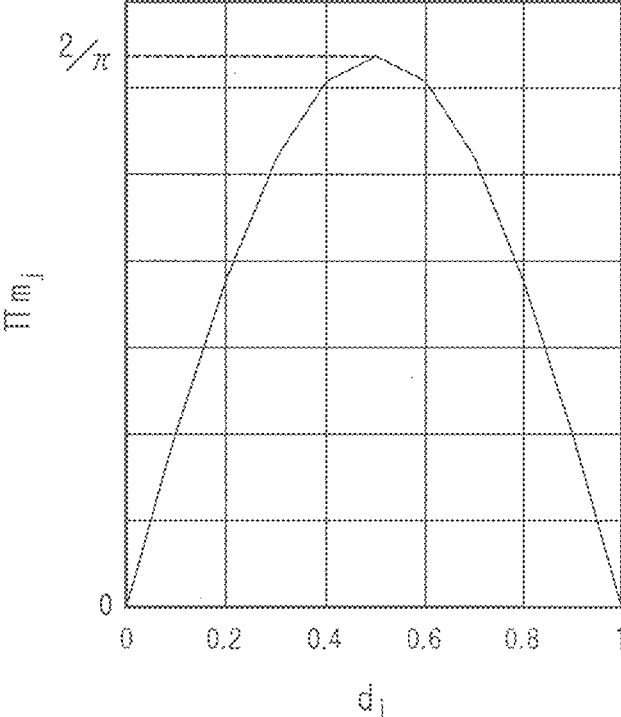

F I G. 2 2
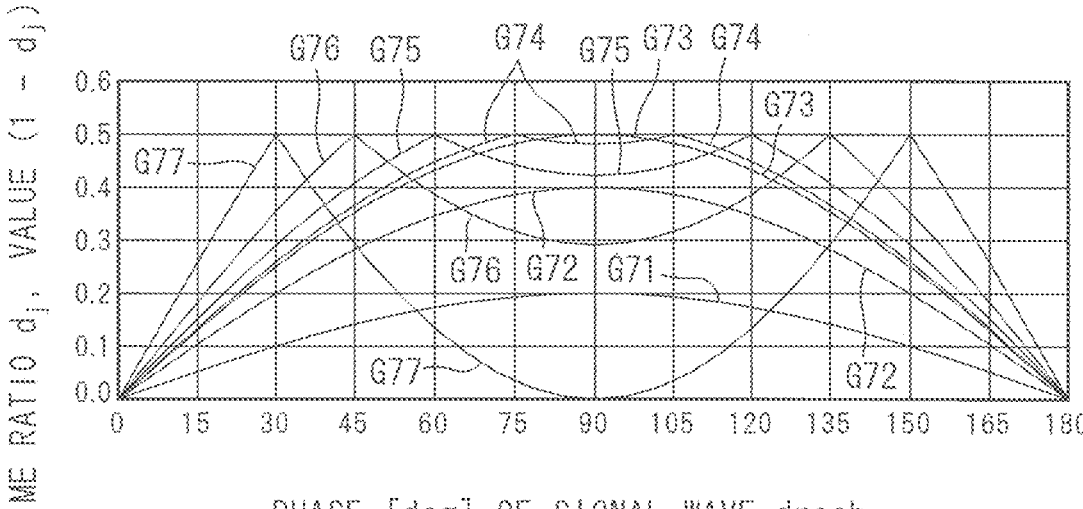
F I G. 2 3
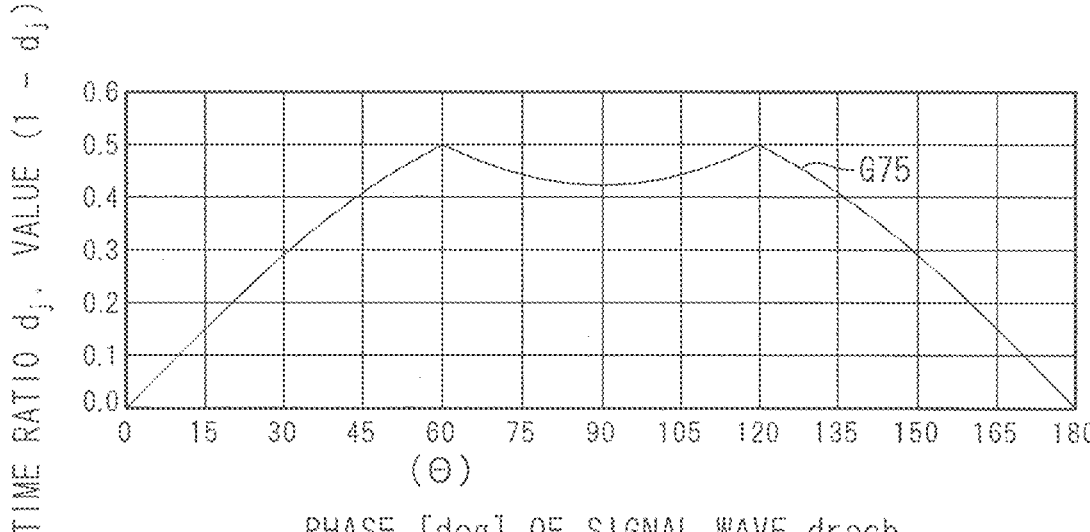

F I G . 2 4
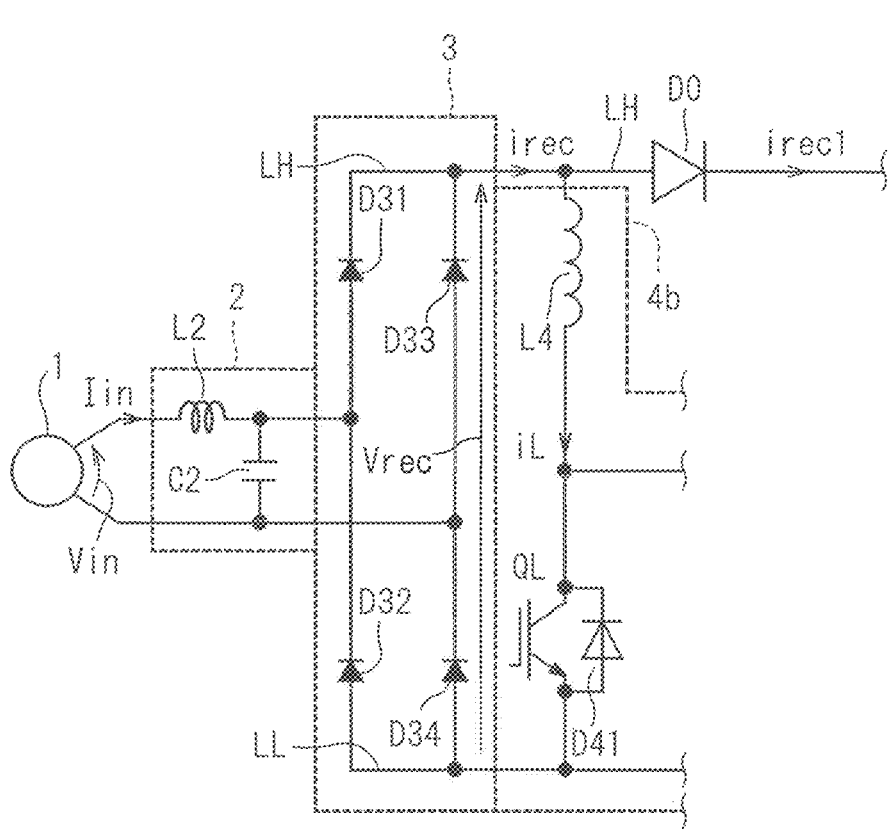

METHOD FOR CONTROLLING POWER CONVERTER

TECHNICAL FIELD

The present disclosure relates to power conversion.

BACKGROUND ART

For example, the 2021 National Meeting of the Institute of Electrical Engineers of Japan S12-7 (Yoshioka, Inoue, and Sasaki, "The Latest Trends on EMC Standards for Power Converters" describes that the requirements for EMI (electromagnetic interference) will be imposed on the frequency bandwidth of switching operations in power conversion devices in the future.

The 2021 National Meeting of the Institute of Electrical Engineers of Japan S12-7 (Yoshioka, Inoue, and Sasaki, "The Latest Trends on EMC Standards for Power Converters" describes study situations regarding a standard of a low-voltage system high-order harmonic and a standard of low-voltage system conduction interference. The former standard is intended to define a measurement method and a limit value as IEC61000-03-10 with the target frequency of 2 to 9 kHz, and the latter standard is intended to define a measurement method and a limit value as IEC-61000-6-3 with the target frequency of 9 to 150 kHz. In these standards, a predetermined pseudo power source network (LISN: Line Impedance Stabilization Network) is used to evaluate each voltage effective value and voltage order peak value.

At present, a voltage type rectifier circuit is mainly used as a rectifier circuit included in a power conversion device. In a voltage-type rectifier circuit, a method is employed in which a commercial voltage is switched via a reactor to obtain a direct-current voltage, thereby improving a power factor. In the above-described method, a measure for reducing the ripple current is desired so that a value obtained by converting the ripple current flowing through the rectifier circuit into a voltage value by the above-described pseudo source circuit network does not deviate from the above-described standard.

A power converter used in an air conditioner is required to achieve both improvement in efficiency when a load of the air conditioner is what is called a partial load and expansion of an operation range. In order to meet such a demand, a technique is proposed in which a rectifying operation and a switching operation are used in combination in the operation of the power converter.

Japanese Patent No. 6478881 discloses a technique for selectively performing synchronous rectification, partial switching, and high-speed switching. Synchronous rectification is adopted in an intermediate operating region where the load is small, partial switching is adopted in a rated operating region where the load is larger than that in the intermediate operating region, and high-speed switching is adopted in an operating region where the load is larger.

A single-phase three-phase power converter with an active buffer has also been proposed in which a series connection of a capacitor and a switching element (hereinafter, the switching element is also referred to as a "discharge switch" from the viewpoint of controlling the presence or absence of discharge from the capacitor to the inverter) is provided in parallel between the converter and the inverter.

For example, Japanese Patent No. 5804167 discloses a technique in which, in a single-phase three-phase power converter with an active buffer, a voltage (hereinafter also referred to as a "converter output voltage") output from the converter is boosted to charge the capacitor. Japanese Patent No. 5804167 discloses a technique in which, in a single-phase three-phase power converter with an active buffer, the power output from the converter is divided into the power to be supplied to the active buffer and the power to be supplied to an inverter, and the power to be supplied to the active buffer is smaller than the power to be supplied to the inverter.

CITATION LIST

Summary of Invention

Technical Problem

In order to obtain the effect of synchronous rectification in Japanese Patent No. 6478881, a reactor having an inductance on the order of several mH is required. For a reactor having such an inductance, a silicon steel plate is used from the viewpoint of cost reductions. Since the iron loss of the silicon steel plate is large, the frequency on which the operation of partial switching or high-speed switching is based is desirably low. On the other hand, from the viewpoint of reducing the noise of the reactor, the frequency is desirably higher than the audible range. For these reasons, the frequency is lowered only to about the 16 kHz of the upper limit of the audible range.

From the viewpoint of complying with the standard for low-voltage system conducted emission targeting frequencies in the range of 9 to 150 kHz, a technique of increasing the frequency of switching operations in the power conversion device or increasing the inductance of the reactor is also assumed. However, this technique increases the loss (including heat dissipation) of the reactor, reduces the efficiency of the power conversion device, and reduces the operation range of the air conditioner. The use of a carrier filter is also conceivable, but this leads to a decrease in efficiency at the time of synchronous rectification and an increase in size of the power conversion device.

In a single-phase three-phase power converter with an active buffer, particularly, in a configuration in which a capacitor is charged by boosting a converter output voltage, the direct current flowing through an inverter is switched between the current supplied from a power source via the converter and the current supplied from a buffer circuit by turning on or off a discharge switch based on a predetermined carrier.

In a single-phase three-phase power converter with an active buffer, the same cycle as that of a carrier used for switching in the inverter, for example, is selected as the cycle of a carrier used for switching in the discharge switch (for example, Japanese Unexamined Patent Publication No. 2021-58002). As the carrier having a frequency of, for example, about 5 kHz is used for switching in the inverter, it is desirable to satisfy the standard of low-voltage system high-order harmonics for frequencies in the range of 2 to 9 kHz.

Unlike the technique disclosed in Japanese Patent No. 6478881, the converter in the single-phase three-phase power converter with an active buffer is based on a current source converter, and a carrier filter is employed. In order to increase the margin with respect to the limit value in the standard of the low-voltage system high-order harmonics, it is desirable to increase the filter attenuation factor of the carrier filter or to increase the carrier frequency; however, such an increase is likely to cause an increase in size or a decrease in efficiency of the single-phase three-phase power converter with an active buffer.

According to the present disclosure, a technique for reducing harmonics in a power converter is proposed.

Solution to Problem

A method for controlling a power converter according to the present disclosure is a method for controlling a power converter (100). The power converter (100) includes a direct-current link (7), a converter (3) that rectifies a single-phase alternating-current voltage (Vin), converts a first alternating-current power based on the alternating-current voltage into a direct-current power, and output a first instantaneous power (Pin), an active buffer (4) that exchanges power with the direct-current link (7) and buffers the power at a second instantaneous power (Pbuf), and an inverter (5) that converts a third instantaneous power (Pdc) input from the direct-current link (7) into a second alternating-current power (Pout) and outputs the second alternating-current power (Pout).

The active buffer (4) includes a booster (4b) that boosts a rectified voltage (Vrec) obtained by rectifying the alternating-current voltage (Vin) to generate a first voltage (Vc), and a switch (4a, Sc, Qc) that intermittently applies the first voltage (Vc) from the booster (4b) to the direct-current link.

A first aspect of the method for controlling the power converter according to the present disclosure includes bringing the switch (4a, Sc, Qc) into conduction with a first duty (dc), by controlling one or both of the first duty (dc) and the first voltage (Vc): controlling an equivalent direct-current voltage (Vdc) to be more than a peak value (Vm) of the rectified voltage (Vrec) and equal to or less than the first voltage (Vc) when the second alternating-current power (Pout) is equal to or more than a second threshold less than a first threshold; and setting the equivalent direct-current voltage (Vdc) when the second alternating-current power (Pout) has a first value more than the first threshold to be higher than the equivalent direct-current voltage (Vdc) when the second alternating-current power (Pout) has a second value more than the second threshold and less than the first threshold.

The equivalent direct-current voltage (Vdc) is a direct-current voltage applied to the direct-current link (7) and obtained by dividing the third instantaneous power (Pdc) by a direct current (Idc) which is an average value of a current flowing through the inverter (5).

According to the first aspect of the method for controlling the power converter in the present disclosure, harmonics in the power converter are reduced.

A second aspect of the method for controlling the power converter according to the present disclosure is the first aspect and includes, by the active buffer (4), receiving a fourth instantaneous power (PL) that is a part of the first instantaneous power (Pin) from the direct-current link (7), outputting a fifth instantaneous power (Pc) to the direct-current link (7), and buffering the second instantaneous power (Pbuf=Pc−PL).

The third instantaneous power (Pdc) is a sum of the fifth instantaneous power (Pc) and a sixth instantaneous power (Prec) obtained by subtracting the fourth instantaneous power (PL) from the first instantaneous power (Pin). A power ratio is a ratio (Prec/Pin) of the sixth instantaneous power (Prec) to the first instantaneous power (Pin). The second aspect of the method for controlling the power converter according to the present disclosure includes setting the power ratio when the second alternating-current power (Pout) has the first value to be less than the power ratio when the second alternating-current power (Pout) has the second value.

A third aspect of the method for controlling the power converter according to the present disclosure is the first aspect or the second aspect and, when the second alternating-current power (Pout) is more than the second threshold, a maximum value of a second duty (drec), which is a value obtained by subtracting the first duty (dc) from 1, is more than 0 and less than $1/\sqrt{3}$, or more than $1/\sqrt{3}$ and equal to or less than 1. According to the third aspect of the method for controlling the power converter in the present disclosure, harmonics are further reduced.

A fourth aspect of the method of controlling the power converter according to the present disclosure is the third aspect and, when the second alternating-current power (Pout) is more than the second threshold, a maximum value of the second duty (drec) is more than 0 and less than $1/\sqrt{3}$.

According to the fourth aspect of the method for controlling the power converter in the present disclosure, the equivalent direct-current voltage can be higher. The fact that the maximum value of the second duty is more than $1/\sqrt{3}$ and equal to or less than 1 according to the third aspect improves the efficiency of the power converter.

Both of a fifth aspect and a sixth aspect of the method for controlling the power converter in the present disclosure are the fourth aspect, a boost ratio ($\alpha$) is a value obtained by dividing the first voltage (Vc) by the peak value (Vm), a voltage utilization ratio (R) is a value obtained by dividing the equivalent direct-current voltage by the peak value (Vm), and the boost ratio ($\alpha$) is able to have any of a third value ($\alpha1$) and a fourth value ($\alpha2$) more than the third value. In a case where the second alternating-current power (Pout) is more than the second threshold: when the boost ratio ($\alpha$) has the third value ($\alpha1$), an amplitude (Ih') of a harmonic for the alternating-current voltage (Vin) due to switching of the switch (4a, Sc, Qc) is equal to or more than a predetermined threshold (TH2) with respect to the voltage utilization ratio (R) within a first range (J1) more than 1, and the amplitude (Ih') of the harmonic is less than the predetermined threshold (TH2) with respect to the voltage utilization ratio (R) outside the first range (J1). When the boost ratio ($\alpha$) has the fourth value ($\alpha2$), the amplitude (Ih') of the harmonic is equal to or more than the predetermined threshold (TH2) with respect to the voltage utilization ratios (R) within a second range (J2) more than 1, and the amplitude (Ih') of the harmonic is less than the predetermined threshold (TH2) with respect to the voltage utilization ratio (R) outside the second range (J2).

According to a fifth aspect of the method for controlling the power converter in the present disclosure, the fourth value ($\alpha2$) is adopted as the boost ratio ($\alpha$) when the voltage utilization ratio (R) is more than an upper limit (J2u) of the second range.

According to a sixth aspect of the method for controlling the power converter in the present disclosure, the third value ($\alpha1$) is adopted as the boost ratio ($\alpha$) when the voltage utilization ratio (R) is more than an upper limit (J1u) of the first range and equal to or less than an upper limit (J2u) of the second range (J2).

A seventh aspect of the method for controlling the power converter in the present disclosure is the fourth aspect, a boost ratio ($\alpha$) is a value obtained by dividing the first voltage (Vc) by the peak value (Vm), a voltage utilization ratio (R) is a value obtained by dividing the equivalent direct-current voltage by the peak value (Vm), and the boost ratio ($\alpha$) is able to have any of a third value ($\alpha1$) and a fourth value ($\alpha2$) more than the third value ($\alpha1a$; $\alpha1b$). In a case where the second alternating-current power (Pout) is more than the second threshold: when the boost ratio ($\alpha$) has the third value ($\alpha 1a$; $\alpha 1b$), an amplitude (Ih') of a harmonic for the alternating-current voltage (Vin) due to switching of the switch (4$a$, Sc, Qc) is equal to or more than a predetermined threshold (TH3) with respect to the voltage utilization ratio (R) equal to or less than a first lower limit value (d1) more than 1, and the amplitude (Ih') of the harmonic is less than the predetermined threshold (TH3) with respect to the voltage utilization ratio (R) more than the first lower limit value (d1$a$; d1$b$). When the boost ratio ($\alpha$) has the fourth value ($\alpha 2$), the amplitude (Ih') of the harmonic is equal to or more than the predetermined threshold (TH3) with respect to the voltage utilization ratio (R) equal to or less than a second lower limit value (d2) higher than the first lower limit value (d1$a$; d1$b$), and the amplitude (Ih') of the harmonic is less than the predetermined threshold (TH3) with respect to the voltage utilization ratio (R) more than the second lower limit value (d2).

According to the seventh aspect of the method for controlling the power converter in the present disclosure, when the third value ($\alpha 1b$) is equal to or more than the second lower limit value (d2), the third value ($\alpha 1b$) is adopted as the boost ratio ($\alpha$) when the voltage utilization ratio (R) is more than the first lower limit value (d1$b$) and less than the second lower limit value (d2); and when the third value ($\alpha 1a$) is less than the second lower limit value (d2), the third value ($\alpha 1a$) is adopted as the boost ratio ($\alpha$) when the voltage utilization ratio (R) is more than the first lower limit value (d1$a$) and less than the third value ($\alpha 1$).

An eighth aspect of the method for controlling the power converter in the present disclosure is the seventh aspect, and when the third value ($\alpha 1b$) is equal to or more than the second lower limit value (d2), the fourth value ($\alpha 2$) is adopted as the boost ratio ($\alpha$) when the voltage utilization ratio (R) is more than the second lower limit value (d2).

According to the eighth aspect of the method for controlling the power converter in the present disclosure, the equivalent direct-current voltage becomes higher.

A ninth aspect of the method for controlling the power converter according to the present disclosure is the third aspect, and when the second alternating-current power (Pout) is more than the second threshold, a maximum value of the second duty (drec) is more than $1/\sqrt{3}$ and equal to or less than 1.

According to the ninth aspect of the method for controlling the power converter in the present disclosure, the efficiency of the power converter is improved.

Both a tenth aspect and an eleventh aspect of the method for controlling the power converter according to the present disclosure are the ninth aspect, a boost ratio ($\alpha$) is a value obtained by dividing the first voltage (Vc) by the peak value (Vm), a voltage utilization ratio (R) is a value obtained by dividing the equivalent direct-current voltage by the peak value (Vm), and the boost ratio ($\alpha$) is able to have any of a third value ($\alpha 1$) and a fourth value ($\alpha 2$) more than the third value. In a case where the second alternating-current power (Pout) is more than the second threshold: when the boost ratio ($\alpha$) has the third value ($\alpha 1$), an amplitude (Ih') of a harmonic for the alternating-current voltage (Vin) due to switching of the switch (4$a$, Sc, Qc) is equal to or more than a predetermined threshold (TH2) with respect to the voltage utilization ratio (R) within a first range (J1) more than 1, and the amplitude (Ih') of the harmonic is less than the predetermined threshold (TH2) with respect to the voltage utilization ratio (R) outside the first range (J1). When the boost ratio ($\alpha$) has the fourth value ($\alpha 2$), the amplitude (Ih') of the harmonic is equal to or more than the predetermined threshold (TH2) with respect to the voltage utilization ratio (R) within a second range (J2) more than 1, and the amplitude (Ih') of the harmonic is less than the predetermined threshold (TH2) with respect to the voltage utilization ratio (R) outside the second range (J2).

According to a tenth aspect of the method for controlling the power converter in the present disclosure, the fourth value ($\alpha 2$) is adopted as the boost ratio ($\alpha$) when the voltage utilization ratio (R) is equal to or more than a lower limit (J1$d$) of the first range and is less than a lower limit (J2$d$) of the second range (J2).

According to an eleventh aspect of the method for controlling the power converter in the present disclosure, when the first duty (dc) has a fifth value and the boost ratio ($\alpha$) has the fourth value ($\alpha 2$), the voltage utilization ratio (R) has a lower limit (J1$d$) of the first range. According to the eleventh aspect of the method for controlling the power converter in the present disclosure, when the voltage utilization ratio (R) is less than a lower limit (J1$d$) of the first range, a value less than the fifth value is adopted as the first duty, and the third value ($\alpha 1$) is adopted as the boost ratio ($\alpha$).

According to the eleventh aspect of the method for controlling the power converter in the present disclosure, the efficiency of the power converter is improved.

A twelfth aspect of the method for controlling the power converter in the present disclosure is any one of the first aspect to the eleventh aspect, and the booster (4$b$) includes a boost chopper. The twelfth aspect of the method for controlling the power converter in the present disclosure includes causing the boost chopper to execute chopping of a current (iL) to be input to the boost chopper by using a frequency higher than a frequency of a carrier used for switching of the inverter (5).

A thirteenth aspect of the method for controlling the power converter in the present disclosure is the twelfth aspect, and the power converter (100) further includes a filter (2) having a cutoff frequency lower than the frequency of the carrier. The alternating-current voltage (Vin) is input to the converter (3) via the filter (2).

A fourteenth aspect of the method for controlling the power converter in the present disclosure is the twelfth aspect, and the power converter (100) further includes a filter (2) having a cutoff frequency lower than the frequency of the carrier. The first instantaneous power (Pin=Prec+PL) is output from the converter (3) via the filter (2).

Both the thirteenth aspect and the fourteenth aspect of the method for controlling the power converter according to the present disclosure contribute to preventing not only the ripple current caused by the switching of the inverter but also the ripple current caused by the switching of the booster from propagating to the single-phase alternating-current side.

A fifteenth aspect of the method for controlling the power converter in the present disclosure is any one of the first aspect to the eleventh aspect, and the booster (4$b$) includes a boost chopper. The fifteenth aspect of the method for controlling the power converter according to the present disclosure includes causing the boost chopper to execute chopping of a current (iL) to be input to the boost chopper by using a frequency higher than a frequency at which the switch (4$a$, Sc, Qc) performs switching.

A sixteenth aspect of the method for controlling the power converter according to the present disclosure is the fifteenth aspect, and the power converter (100) further includes a filter (2) having a cutoff frequency lower than the frequency at which the switch (4a, Sc, Qc) performs switching. The alternating-current voltage (Vin) is input to the converter (3) via the filter (2).

A seventeenth aspect of the method for controlling the power converter according to the present disclosure is the fifteenth aspect, and the power converter (100) further includes a filter (2) having a cutoff frequency lower than the frequency at which the switch (4a, Sc, Qc) performs switching. The first instantaneous power (Pin=Prec+PL) is output from the converter (3) via the filter (2).

Both of the sixteenth aspect and the seventeenth aspect of the method of controlling the power converter according to the present disclosure contribute to preventing not only the ripple current caused by the switching of the switch but also the ripple current caused by the switching of the booster from propagating to the single-phase alternating-current side.

An eighteenth aspect of the method for controlling the power converter according to the present disclosure is any one of the first aspect to the seventeenth aspect and includes, by controlling the first duty (dc), when the second alternating-current power is less than the second threshold: adopting any one of: performing control to alternately provide a non-conduction period in which the first duty (dc) is 0 and a conduction period in which the first duty (dc) is positive; and performing another control in which a length of the non-conduction period is substantially 0.

According to the eighteenth aspect of the method for controlling the power converter in the present disclosure, the efficiency of the power converter is improved.

BRIEF DESCRIPTION OF DRAWINGS

FIG. 2 is a block diagram schematically illustrating a power balance in the power converter.

FIG. 3 is a circuit diagram illustrating an equivalent circuit of the power converter.

FIG. 4 is a graph illustrating the dependency of a power ratio on a voltage utilization ratio.

FIG. 5 is a graph illustrating equivalent PWM modulation.

FIG. 6 is a graph illustrating the relationship between the order and the amplitude of the harmonic component when the power frequency is the fundamental frequency.

FIG. 7 is a graph illustrating the relationship between the order and the amplitude of the harmonic component when the power frequency is the fundamental frequency.

FIG. 8 is a graph illustrating a harmonic amplitude with respect to a frequency in a polygonal line.

FIG. 9 is a graph illustrating a harmonic amplitude with respect to a frequency in a polygonal line.

FIG. 10 is a graph illustrating a harmonic amplitude with respect to a frequency in a polygonal line.

FIG. 11 is a graph illustrating the relationship between a modulation factor and a harmonic amplitude.

FIG. 12 is a graph illustrating a harmonic amplitude with respect to a frequency in a polygonal line.

FIG. 13 is a graph illustrating a harmonic amplitude with respect to a frequency in a polygonal line.

FIG. 14 is a graph illustrating a harmonic amplitude with respect to a frequency in a polygonal line.

FIG. 15 is a graph illustrating the relationship between a modulation factor and a harmonic amplitude.

FIG. 18 is a block diagram illustrating an example of a conceptual configuration of a control device that controls the power converter.

FIG. 20 is a graph illustrating a pulse waveform in a carrier cycle.

FIG. 21 is a graph illustrating the relationship between a time ratio and an amplitude of a converter-side carrier frequency component of a pulse waveform.

FIG. 22 is a graph illustrating the relationship between the phase of a signal wave and the time ratio.

FIG. 23 is a graph illustrating the relationship between the phase of the signal wave and the time ratio.

FIG. 24 is a circuit diagram partially illustrating the power converter.

DESCRIPTION OF EMBODIMENTS

Figure 1:
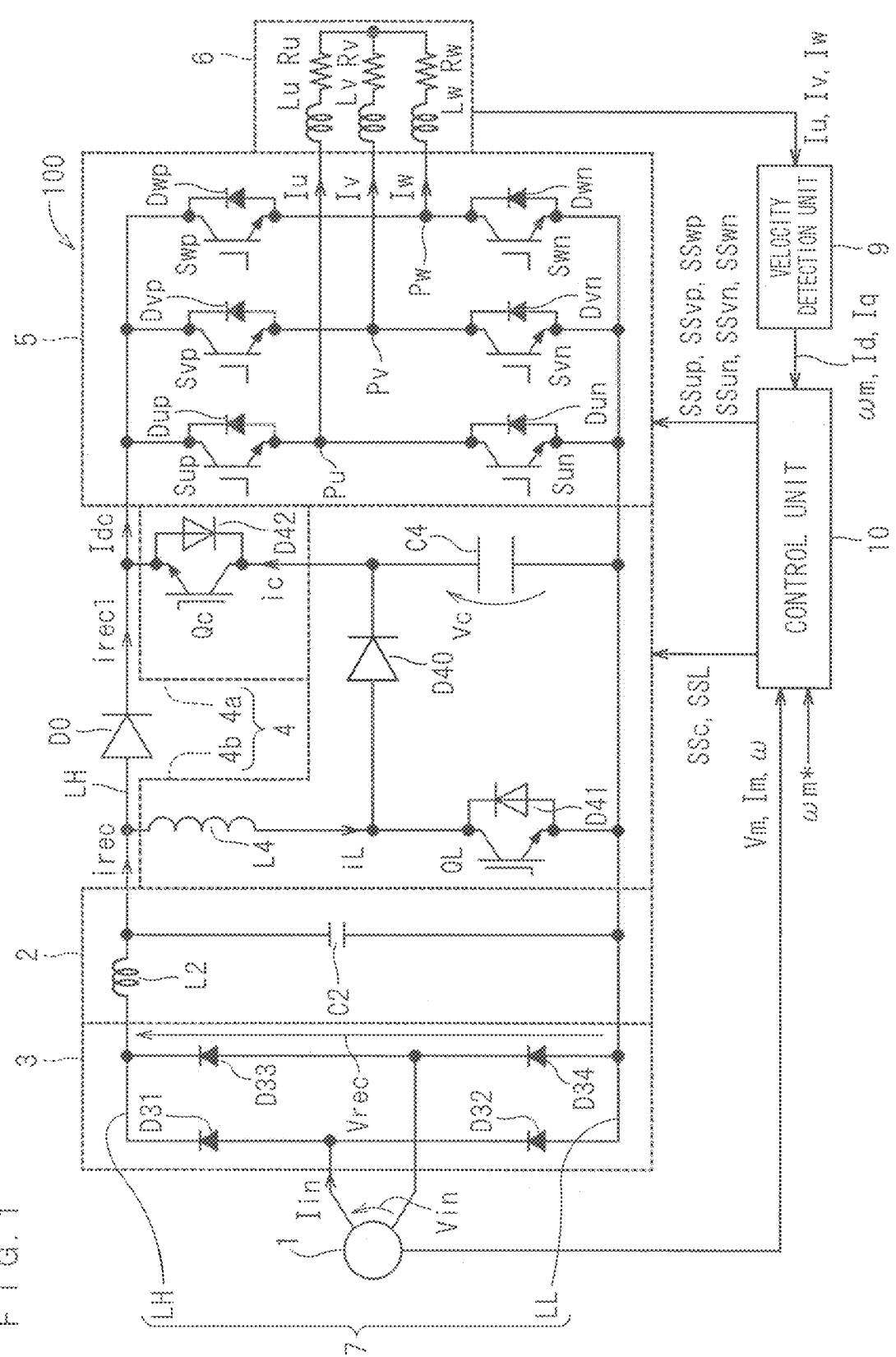
FIG. 1 is a circuit diagram illustrating a power converter and its periphery according to the present embodiment.

A. Configuration of Power Converter
(a-1) Overall Configuration and Power Balance FIG. 1 is a circuit diagram illustrating a power converter 100 and its periphery according to the present embodiment. The power converter 100 is a direct-type power conversion device, and its configuration itself is known from, for example, Japanese Patent No. 5804167. It can be said that the power converter 100 is an example of a power converter to which a power conversion method according to the present disclosure is applied, and it can be said that the power converter 100 is an example of a power converter according to the present disclosure realized by performing predetermined control.

FIG. 2 is a block diagram schematically illustrating the power balance in the power converter 100. The configuration of the block diagram itself is also known from, for example, Japanese Patent No. 5804167.

The power converter 100 includes a filter 2, a converter 3, an active buffer 4, an inverter 5, and a direct-current link 7. Since the active buffer 4 buffers the power as described below, the active buffer 4 is referred to as a "power buffer circuit 4" in Japanese Patent No. 5804167.

The power converter 100 receives a single-phase alternating-current voltage Vin and a single-phase alternating current Iin from a single-phase alternating-current power source 1.

The converter 3 rectifies the alternating-current voltage Vin to obtain a rectified voltage Vrec. The converter 3 converts the alternating-current power into a direct-current power by rectification and outputs an instantaneous power Pin.

The active buffer 4 receives an instantaneous power PL (referred to as "Pl" in Japanese Patent No. 5804167), which is a part of the instantaneous power Pin, from the converter 3, outputs an instantaneous power Pc, and buffers an instantaneous power Pbuf (=Pc−PL).

The inverter 5 receives an instantaneous power Prec (=Pin−PL), which is obtained by subtracting the instantaneous power PL from the instantaneous power Pin, from the converter 3 and receives the instantaneous power Pc from the active buffer 4. The inverter 5 converts an instantaneous power Pdc, which is the sum of the instantaneous power Prec and the instantaneous power Pc, into an instantaneous power Pout and outputs the instantaneous power Pout (the notation "Pout" is omitted in Japanese Patent No. 5804167). The instantaneous power Pout is output to an alternating-current load 6.

The direct-current link 7 includes direct-current power lines LH, LL.

(a-2) Description of Filter 2

The converter 3 is connected to the active buffer 4 via a filter 2. The filter 2 functions as a low-pass filter. For example, the filter 2 includes a reactor L2 and a capacitor C2. The capacitor C2 is provided, for example, between the direct-current power line LH and the direct-current power line LL and is provided in parallel to the input side of the active buffer 4.

The filter 2 suppresses a ripple current caused by switching associated with the operation of the active buffer 4 and the operation of the inverter 5 from propagating to the single-phase alternating-current power source 1. Furthermore, the filter 2 also has a function of transmitting the rectified voltage Vrec to the active buffer 4. Therefore, the cutoff frequency of the filter 2 is set high enough to transmit the rectified voltage Vrec from the converter 3 to the active buffer 4 and is set low enough to suppress the ripple current caused by switching from propagating to the single-phase alternating-current power source 1.

For example, the cutoff frequency of the filter 2 is lower than the frequency (hereinafter also referred to as an "inverter-side carrier frequency") of a carrier used for switching of the inverter 5. For example, the cutoff frequency of the filter 2 is lower than the frequency at which a switch (described below) that determines whether a capacitor included in the active buffer 4 is discharged is switched.

The filter 2 can be ignored in the power balance. When the loss in the converter 3 is ignored, the instantaneous power given to the converter 3 by the alternating-current voltage Vin and the alternating current Iin is given to the direct-current link 7 as the instantaneous power Pin.

(a-3) Description of Converter 3

The converter 3 employs, for example, a diode bridge and includes diodes D31 to D34. The diodes D31 to D34 constitute a bridge circuit and convert the alternating-current voltage Vin into the rectified voltage Vrec (which is ideally equal to the absolute value Vin of the alternating-current voltage Vin) by single-phase full-wave rectification.

The converter 3 applies the rectified voltage Vrec to the active buffer 4 via the filter 2. The rectified voltage Vrec is output between the direct-current power lines LH and LL, and a potential higher than that of the direct-current power line LL is applied to the direct-current power line LH.

(a-4) Description of Active Buffer 4

The active buffer 4 includes a switching circuit 4a and a booster 4b. The active buffer 4 receives the instantaneous power PL from the direct-current link 7 and outputs the instantaneous power Pc to the direct-current link 7.

(a-4-1) Description of Switching Circuit 4a

The switching circuit 4a includes a diode D42 and a transistor Qc. The diode D42 is connected in series with a capacitor C4, which will be described below, between the direct-current power lines LH and LL. The forward direction of the diode D42 is arranged in a direction from the direct-current power line LH to the direct-current power line LL. The diode D42 is arranged closer to the direct-current power line LH than the capacitor C4.

For example, an insulated gate bipolar transistor (hereinafter abbreviated as "IGBT") is employed as the transistor Qc. The transistor Qc is connected in anti-parallel to the diode D42. Here, the anti-parallel connection refers to a parallel connection in which the forward directions are opposite to each other. Specifically, the forward direction of the transistor Qc is a direction from the direct-current power line LL to the direct-current power line LH, and the forward direction of the diode D42 is a direction from the direct-current power line LH to the direct-current power line LL.

The capacitor C4 is discharged by the conduction of the transistor Qc, and the instantaneous power Pc is output from the active buffer 4 to the direct-current link 7. A current ic flows from the capacitor C4 to the direct-current link 7, and the instantaneous power Pc is output from the active buffer 4 to the direct-current link 7.

A current irec1 flows from the converter 3 to the inverter 5 via the direct-current link 7 (described below).

A direct current Idc supplied to the inverter 5 is divided into currents ic, irec1 based on conduction ratios dc, drec expressed by Math. (1).

[Math. 1]

$$ic = dc \cdot Idc, \ irec1 = drec \cdot Idc \tag{1}$$

(a-4-2) Description of Booster 4b

The booster 4b includes a capacitor C4, a diode D40, a reactor L4, and a transistor QL.

The diode D40 includes a cathode and an anode, and the cathode is connected between the transistor Qc and the capacitor C4. The reactor L4 is connected between the direct-current power line LH and the anode of the diode D40. The transistor QL is connected between the direct-current power line LL and the anode of the diode D40. For example, an IGBT is used as the transistor QL. In the booster 4b, the capacitor C4 is charged to a voltage Vc via the diode D40. Hereinafter, the voltage Vc applied to both ends of the capacitor C4 is also referred to as a "capacitor voltage".

For example, the rectified voltage Vrec is boosted to charge the capacitor C4 by intermittently opening or closing the transistor QL (by what is called chopping) to accumulate or discharge energy in or from the reactor L4. Since such an operation is performed, the diode D40, the reactor L4, and the transistor QL can be understood as a boost chopper.

However, the booster 4b may perform an operation of charging the capacitor C4 without boosting the rectified voltage Vrec. For example, when the transistor QL is kept open (non-conduction is maintained), the current iL flowing through the reactor L4 charges the capacitor C4 via the diode D40. By such charging, the capacitor voltage Vc can be considered to be equal to a peak value Vm (this is also the amplitude of the alternating-current voltage Vin and is assumed to have a constant value) of the rectified voltage Vrec. This is because the peak value Vm is generally large to the extent that voltage drops in the diodes D31, D33, D40 and the reactors L2, L4 can be ignored.

The operation of the booster 4b in which Vc=Vm is known, for example, from Japanese Unexamined Patent Publication No. 2021-58002. Vc>Vm in the operation of the booster 4b is known, for example, from Japanese Patent No. 5804167.

The booster 4b further includes a diode D41. The diode D41 is connected in anti-parallel to the transistor QL. Specifically, the forward direction of the transistor QL is a direction from the direct-current power line LH to the direct-current power line LL, and the forward direction of the diode D41 is a direction from the direct-current power line LL to the direct-current power line LH.

Since the potential of the direct-current power line LH is higher than that of the direct-current power line LL, basically no current flows through the diode D41. As $Vc \geq Vm \geq Vrec$, basically no current flows through the diode D42.

The current irec (which is equal to the absolute value |Iin| of the alternating current Iin, ignoring harmonic components blocked by the filter 2) flows into the direct-current link 7 from the converter 3. The current iL flows from the direct-current link 7 into the booster 4b, and the current irec1 flows through the direct-current link 7 between the booster 4b and the switching circuit 4a. Since the currents iL, irec1 are divided from the current irec, Math. (2) is established.

[Math. 2]

$$irec = irec1 + iL \qquad (2)$$

As illustrated in Math. (1), the direct current Idc is divided into the current irec1 and the current ic through the direct-current link 7.

(a-4-3) Description of Current Blocking Element D0

A current blocking element D0 is interposed in the direct-current power line LH between the switching circuit 4a and the booster 4b. When the switching circuit 4a conducts, the capacitor voltage Vc is applied to the direct-current power line LH from the active buffer 4 on the inverter 5 side of the current blocking element D0, and the rectified voltage Vrec is applied to the direct-current power line LH from the converter 3 via the filter 2 on the converter side of the current blocking element D0. The converter 3 outputs the instantaneous power Pin via the filter 2.

As $Vc \geq Vm \geq Vrec$, the current blocking element D0 contributes to maintaining the potential on the inverter 5 side to be equal to or more than the potential on the converter 3 side. The current blocking element D0 prevents a current from flowing from the capacitor C4 to the filter 2 via the direct-current power line LH, and thus prevents the capacitor C2 from being charged by the capacitor voltage Vc.

For example, a diode is used as the current blocking element D0. The anode of the diode is connected to the anode of the diode D40 via the reactor L4. The cathode of the diode is connected to the cathode of the diode D40 via the switching circuit 4a.

(a-5) Description of Inverter 5

The inverter 5 converts a direct-current voltage between the direct-current power lines LH and LL on the side closer to the inverter 5 than the current blocking element D0 into an alternating-current voltage and outputs the alternating-current voltage to output ends Pu, Pv, Pw. The inverter 5 includes six switching elements Sup, Svp, Swp, Sun, Svn, Swn. The switching elements Sup, Svp, Swp are respectively connected between the output ends Pu, Pv, Pw and the direct-current power line LH, and the switching elements Sun, Svn, Swn are respectively connected between the output ends Pu, Pv, Pw and the direct-current power line LL. The inverter 5 forms what is called a voltage source inverter and includes six diodes Dup, Dvp, Dwp, Dun, Dvn, Dwn.

Each of the diodes Dup, Dvp, Dwp, Dun, Dvn, Dwn is arranged with its cathode directed to the direct-current power line LH side and its anode directed to the direct-current power line LL side. The diode Dup is connected in anti-parallel to the switching element Sup between the output end Pu and the direct-current power line LH. Similarly, the diodes Dvp, Dwp, Dun, Dvn, Dwn are respectively connected in anti-parallel to the switching elements Svp, Swp, Sun, Svn, Swn.

Alternating currents Iu, Iv, Iw are output from the output ends Pu, Pv, Pw to the load 6, and these currents constitute a three-phase alternating current. For example, an IGBT is used as the switching elements Sup, Svp, Swp, Sun, Svn, Swn.

(a-6) Description of Alternating-Current Load 6

The alternating-current load 6 is an inductive load, for example, a three-phase motor. In FIG. 1, the alternating-current load 6 is illustrated as an equivalent circuit representing an inductive load. To be specific, the alternating-current load 6 is illustrated to include reactors Lu, Lv, Lw and resistors Ru, Rv, Rw. One end of the series connection of the reactor Lu and the resistor Ru is connected to the output end Pu. One end of the series connection of the reactor Lv and the resistor Rv is connected to the output end Pv. One end of the series connection of the reactor Lw and the resistor Rw is connected to the output end Pw. The other ends of the three series connections are connected to one another, and the alternating-current load 6 has a configuration called a star connection.

(a-7) Description of Equivalent Circuit

FIG. 3 is a circuit diagram illustrating an equivalent circuit of the power converter 100. In the equivalent circuit, the single-phase alternating-current power source 1, the filter 2, and the converter 3 are collectively represented as a voltage source that outputs the voltage |Vin|.

In the equivalent circuit, the current irec1 is equivalently represented as the current irec1 passing through a switch Srec when the switch Srec conducts. The conduction of the switch Srec indicates irec1>0, and the non-conduction of the switch Srec indicates irec1=0. How the switch Srec conducts or does not conduct will be described below.

The current ic is equivalently expressed as the current ic passing through the switch Sc when the switch Sc conducts. The conduction of the switch Sc indicates ic>0, and the non-conduction of the switch Sc indicates ic=0. Conduction or non-conduction of the switch Sc equivalently indicates on or off of the transistor Qc, respectively.

In the equivalent circuit, the capacitor C4, the reactor L4, the diode D40, and a switch SL constituting the booster 4b are illustrated, and the current iL flowing through the reactor L4 is added. Conduction or non-conduction of the switch SL equivalently indicates on or off of the transistor QL, respectively.

The inverter 5 is illustrated using a switch Sz, the direct current Idc, and an equivalent voltage source Vo. The conduction of the switch Sz equivalently indicates a situation (hereinafter, also referred to as a "reflux situation") in which the output ends Pu, Pv, and Pw are connected in common to any one of the direct-current power lines LH, LL in the inverter 5. When the switch Sz conducts, a current iz flows through the switch Sz. The current iz equivalently indicates a current (hereinafter, also referred to as a "zero-phase current") flowing through the alternating-current load 6 via the inverter 5 in the reflux situation.

When the switch Sz does not conduct, the direct current Idc flows from the voltage source that outputs the voltage |Vin| to the inverter 5 as the current irec1 and from the booster 4b to the inverter 5 as the current ic in a time-division manner.

The equivalent current source Io equivalently represents the alternating currents Iu, Iv, Iw flowing from the inverter 5 to the alternating-current load 6 in terms of the direct current Io. The equivalent voltage source Vo equivalently represents the alternating-current voltage applied to the alternating-current load 6 by the inverter 5 as converted into a direct-current voltage.

In the equivalent circuit, a modulation factor D of the inverter 5 is expressed as Vo/Vdc using an equivalent direct-current voltage Vdc between the direct-current power lines LH and LL and the direct-current voltage Vo output from the equivalent voltage source Vo.

Since the instantaneous power Pdc input to the inverter 5 is equal to the instantaneous power Pout output from the inverter 5 (see FIG. 2), the instantaneous power Pdc is represented by the product of the equivalent direct-current voltage Vdc and the direct current Idc, and the instantaneous power Pout is represented by the product of the direct-current voltage Vo and the direct current Io supplied from the equivalent current source Io, the modulation factor D is also represented by Idc/Io.

By introducing duties drec, dc, and dz at which the switches Srec, Sc, and Sz conduct in the equivalent circuit, Math. (3) is established from Math. (2). The duties drec, dc are equal to the above-described conduction ratios drec, dc.

[Math. 3]

$$\begin{pmatrix} irec \\ ic \\ iz \end{pmatrix} = \begin{pmatrix} drec & 1 \\ dc & 0 \\ dz & 0 \end{pmatrix} \cdot \begin{pmatrix} Idc \\ iL \end{pmatrix} \tag{3}$$

Since the currents irec1, ic, iz are each obtained by multiplying the direct current Idc by the duties drec, dc, dz, they are average values over the switching cycle of the switches Srec, Sc, Sz.

Since the direct current Idc is the sum of the currents irec1, ic, iz flowing through the switches Srec, Sc, Sz, Math. (4) is satisfied. However, 0≤drec≤1, 0≤dc≤1, 0≤dz≤1.

[Math. 4]

$$drec + dc + dz + 1 \tag{4}$$

A specific example of the duties drec, dc, dz is introduced in, for example, Japanese Patent No. 5804167, Japanese Patent No. 5629885, and Japanese Unexamined Patent Publication No. 2021-58002.

When the switch Sz conducts, both the currents irec1, ic are 0, and both the switches Srec, Sc do not equivalently conduct. When the switch Sz does not conduct, the switch Sc can conduct. When the switch Sc conducts, the capacitor voltage Vc (≥Vm≥Vrec) is applied to the direct-current link 7, so irec1=0 and both the switches Srec, Sz do not equivalently conduct. When the switch Sz does not conduct and the switch Sc does not also conduct, the current irec1 flows in the direct-current power line LH. Therefore, it can be said that, instantaneously, the switches Srec, Sc, Sz alternatively conduct.

The converter 3 does not actively pass the current irec1 to the direct-current link 7. The conduction or non-conduction of the switch Srec is determined by the switching of the inverter 5 under the limitation by the duty dz and the switching of the switch Sc based on the duty dc and, accordingly, the current irec1 flows (irec1>0) or does not flow (irec1=0).

The direct-current voltage used for power supply to the inverter 5 in the direct-current link 7 has a meaning in power conversion. In other words, an instantaneous direct-current voltage that is not used for power conversion by the inverter 5 has no meaning in viewpoints of power and harmonics. During the period in which the zero-phase current iz flows, the inverter 5 cannot perform power conversion using the direct-current voltage in the direct-current link 7.

From this viewpoint, the equivalent direct-current voltage Vdc is a direct-current voltage that is applied to the direct-current link 7 and is obtained by dividing the instantaneous power Pdc by the direct current Idc.

When the switch Srec conducts, the switch Sc does not conduct and the rectified voltage Vrec is applied to the direct-current link 7, and when the switch Sc conducts, the switch Srec does not conduct and the capacitor voltage Vc is applied to the direct-current link 7. Therefore, according to the present embodiment, the sum of the product Vrec·drec of the duty drec and the rectified voltage Vrec and the product Vc·dc of the duty dc and the capacitor voltage Vc is adopted as the equivalent direct-current voltage Vdc.

The equivalent direct-current voltage Vdc can also be regarded as a voltage applied to the direct-current link 7 as an average of the maximum value of the voltage that can be output by the inverter 5 in a cycle of controlling the switching of the switches Sc, SL and the inverter 5. This is because both the switches Srec, Sc do not conduct in the period corresponding to the duty dz, the inverter 5 is in the reflux situation, and the inverter 5 is not electrically connected to the direct-current link 7.

The equivalent direct-current voltage Vdc is added as a voltage applied to the input side of the inverter 5 in FIG. 3.

B. Reduction of Harmonics Derived from Carrier Employed for Switching of Inverter 5

(b-1) Control by Equivalent Direct-Current Voltage Vdc

A carrier component of switching in the inverter 5 is a harmonic for the current irec and thus for the alternating current Iin. Then, from Math. (1) and (2), irec=drec·Idc+iL. The smaller the direct current Idc is, the smaller the harmonic derived from the switching of the inverter 5 in the current irec is. The following Math. (5) holds for the modulation factor D.

[Math. 5]

$$D = Idc/Io = Vo/Vdc \tag{5}$$

When the instantaneous power Pout (=Io·Vo) is constant, setting the higher equivalent direct-current voltage Vdc contributes to a decrease in the direct current Idc, and thus contributes to a reduction in harmonics (hereinafter, also referred to as "high-order harmonics") in a frequency band related to low-voltage system high-order harmonics in the power converter 100.

The equivalent direct-current voltage Vdc is the sum of the product drec. Vrec and the product dc. Vc, and when the duty dz is constant (for example, zero), the duty drec decreases as the duty dc increases. Therefore, the equivalent direct-current voltage Vdc becomes higher by increasing one or both of the duty dc and the capacitor voltage Vc.

In the following description, for convenience, the operation of the power converter 100 when Vm<Vdc (≤Vc) may be referred to as a boost operation, and the operation of the power converter 100 when Vdc≤Vm may be referred to as a non-boost operation.

(b-2) Control by Duty Dc or Capacitor Voltage Vc

When the instantaneous power Pc is supplied to the direct-current link 7, the switch Srec does not conduct and the switch Sc conducts, and when the instantaneous power Prec is supplied to the direct-current link 7, the switch Sc does not conduct and the switch Srec conducts. The conduction of the switch Srec transmits a carrier component of switching in the inverter 5 to the current irec. From this viewpoint, it can be said that a reduction in the instantaneous power Prec contributes to a reduction in high-order harmonics in the power converter 100.

For convenience of the following description, a boost ratio α and a voltage utilization ratio R are introduced. In addition, in order to simplify the description, the case where the duty dz is 0 (that is, the case where drec=1−dc) is exemplified.

The boost ratio α is defined by a ratio Vc/Vm of the capacitor voltage Vc to the peak value Vm.

The voltage utilization ratio R is defined by a ratio Vdc/Vm of the equivalent direct-current voltage Vdc to the peak value Vm. When the duty dc is fixed, the equivalent direct-current voltage Vdc increases as the boost ratio α increases. When the boost ratio α is fixed, the equivalent direct-current voltage Vdc increases as the duty dc increases. However, since dc≤1, R≤α.

FIG. 4 is a graph illustrating the dependency of power ratios Prec/Pin, PL/Pin on the voltage utilization ratio R when the boost ratio α is used as a parameter. The case where control is performed such that the equivalent direct-current voltage Vdc has a constant value regardless of a phase ωt of the alternating-current voltage Vin is illustrated.

At any boost ratio α, there is a relationship of Prec/Pin+ PL/Pin=1 regardless of the voltage utilization ratio R. Polygonal lines G11, G12 indicate the ratio Prec/Pin, and polygonal lines G21, G22 indicate the ratio PL/Pin. The polygonal lines G11, G21 indicate the case of α=1.29, and the polygonal lines G12, G22 indicate the case of α=1.47.

The voltage utilization ratio R is controlled by the duties drec and dc. In the case of dc=1, Vdc=Vc and R=a, and Prec/Pin=0 in any of the polygonal lines G11, G12, and PL/Pin=1 in any of the polygonal lines G21, G22.

Assuming that the capacitor voltage Vc or the boost ratio α is fixed, when the duty dc increases, the instantaneous power Prec decreases due to a decrease in the duty drec. At this time, the equivalent direct-current voltage Vdc is also increased. Therefore, in the polygonal lines G11, G12 in which the boost ratio α is fixed, the ratio Prec/Pin decreases as the voltage utilization ratio R increases. It can be said that, when the capacitor voltage Vc is maintained, a decrease in the instantaneous power Prec accompanied by an increase in the equivalent direct-current voltage Vdc contributes to a reduction in high-order harmonics in the power converter 100.

On the other hand, when the capacitor voltage Vc does not need to be maintained, the instantaneous power Prec can be decreased without increasing the equivalent direct-current voltage Vdc. This is because, for example, the ratio Prec/Pin also decreases by decreasing the capacitor voltage Vc and increasing the duty dc while maintaining the product dc·Vc. This is also understood from the fact that the polygonal line G11 indicates a lower value than the polygonal line G12 regardless of the value of the voltage utilization ratio R.

As described above, since the ratio Prec/Pin decreases with an increase in the voltage utilization ratio R, setting the higher equivalent direct-current voltage Vdc when increasing the instantaneous power Pout contributes to a reduction in high-order harmonics in the power converter 100. As described above, the equivalent direct-current voltage Vdc becomes higher by increasing the duty dc.

(b-3) General Description

In (b-1), it has been described that, by increasing the equivalent direct-current voltage Vdc to reduce the direct current Idc, high-order harmonics in the power converter 100 are reduced even when an increase in the duty dc is not necessarily accompanied. In (b-2), it has been described that, by increasing the duty dc, high-order harmonics in the power converter 100 are reduced even when an increase in the equivalent direct-current voltage Vdc is not necessarily accompanied.

By introducing two thresholds for the instantaneous power Pout, specifically, a first threshold and a second threshold less than the first threshold, the following description can be obtained from (b-1) and (b-2).

When the instantaneous power Pout output from the inverter 5 is equal to or more than the second threshold, the boost operation is adopted. By adopting the boost operation, the direct current Idc can be reduced even when the instantaneous power Pout is large, and harmonics are reduced.

When the instantaneous power Pout is equal to or more than the second threshold and the boost operation is adopted, the control depending on the instantaneous power Pout further differs with the first threshold as a boundary. The equivalent direct-current voltage Vdc is different between when the instantaneous power Pout has a value more than the first threshold (an example of the value at this time is temporarily referred to as a "first value") and when the instantaneous power Pout has a value less than the first threshold (an example of the value at this time is temporarily referred to as a "second value": the second value is more than the second threshold).

More specifically, the equivalent direct-current voltage Vdc when the instantaneous power Pout has the first value can be higher than the equivalent direct-current voltage Vdc when the instantaneous power Pout has the second value. This is because the harmonics are reduced by reducing the direct current Idc or by reducing the instantaneous power Prec as described above.

Describing the latter case in line with (b-2), it is described that the ratio Prec/Pin when the instantaneous power Pout has the first value is set to be less than the ratio Prec/Pin when the instantaneous power Pout has the second value.

C. Reduction of Harmonics Due to Switching of Switch Sc

The switch Sc determines whether to merge the current ic with the current irec1. Due to the switching of the switch Sc, high-order harmonics are generated in the power converter 100.

For example, as disclosed in Japanese Unexamined Patent Publication No. 2021-58002, the carrier used for setting the timing of conduction or non-conduction of the switch Sc and the carrier used for setting the timing of conduction or non-conduction of the switching elements Sup, Svp, Swp have the same cycle. In one cycle of the carrier, the switch Sc is switched once from the conductive state to the non-conductive state and is switched once from the non-conductive state to the conductive state. Therefore, both the frequency of the harmonic due to the carrier component of the inverter 5 and the frequency of the harmonic due to the switching of the switch Sc are targets of the standard of low-voltage system high-order harmonics.

The current irec1 flowing from the converter 3 to the direct-current link 7 becomes positive or zero by conduction or non-conduction of the switch Srec, respectively, when viewed in line with the equivalent circuit illustrated in FIG. 3. Therefore, as far as a focus is given on the current irec1, the converter 3 can be equivalently regarded as a current source rectifier in which PWM modulation is performed.

Hereinafter, the above-described PWM modulation when the converter 3 is regarded as an equivalent current source rectifier is temporarily referred to as "equivalent PWM modulation".

It can be considered that a modulation factor ks in the equivalent PWM modulation is controlled by the duty drec at which the switch Srec conducts. Since the duty drec is passively determined by the duty dc at which the switch Sc conducts, it can be considered that the modulation factor ks is controlled by the duty dc.

The harmonic is treated with the alternating current Iin as a fundamental wave, and the fundamental wave of the current irec1 coincides with the product ks·irec of the modulation factor ks and the current irec. The current irec is obtained by full-wave rectifying the alternating current Iin. Therefore, as a signal wave in the equivalent PWM modulation, a sine wave having the same cycle as that of the alternating current Iin, that is, the same cycle as that of the alternating-current voltage Vin is assumed.

Since the current iL flows, the current irec1 is not necessarily a sinusoidal wave, unlike the current irec. However, the current irec1 has the same cycle as the current irec. Therefore, as long as at least the tendency of increase and decrease of the high-order harmonics is grasped, it is appropriate to assume a sine wave for the signal wave as described above.

FIG. 5 is a graph illustrating the equivalent PWM modulation. As described above, the sinusoidal wave having the same cycle as that of the alternating-current voltage Vin is used as a signal wave drecb. Two carriers Cp, Cn are employed for the equivalent PWM modulation.

For example, each of the carriers Cp, Cn is a symmetric triangular wave having a frequency 16 times the frequency of the alternating-current voltage Vin (fs=w/2Π: hereinafter also referred to as "power frequency"). In this example, the power frequency is 50 Hz, and the frequencies of the carriers Cp, Cn (hereinafter also referred to as "converter-side carrier frequencies") are 0.8 kHz. In practice, higher frequencies, for example, 4.5 kHz as described above, are employed as the converter-side carrier frequencies, but the case of 0.8 kHz is illustrated here in order to enhance visibility in the drawing. The carrier Cp has a value of 0 or more and 1 or less, and the carrier Cn has a value of −1 or more and 0 or less.

The signal wave drecb is a sine wave having a power frequency. FIG. 5 illustrates a case where the modulation factor ks is 1, that is, a case where the minimum value of the signal wave drech is −1 and the maximum value is 1.

A pulse waveform Srecb reflects the conduction or non-conduction of the switch Srec. The pulse waveform Srecb is determined by the intersections of the carriers Cp, Cn and the signal wave drech. As described above, since the above-described sinusoidal wave is adopted as the signal wave drecb, the pulse waveform Srecb has any value of −1, 0, 1.

To be more specific, the pulse waveform Srecb has a value of 1 when the value of the signal wave drecb is higher than any of the values of the carriers Cp, Cn, and the pulse waveform Srecb has a value of −1 when the value of the signal wave drecb is lower than any of the values of the carriers Cp, Cn. The pulse waveform Srecb has a value of 0 when the value of the signal wave drecb is equal to or more than the value of the carrier Cn and is equal to or less than the value of the carrier Cp.

The pulse waveform Srecb having any one of the values −1, 1 corresponds to the conduction of the switch Srec, and the pulse waveform Srecb having a value of 0 corresponds to the non-conduction of the switch Srec. Considering the case of dz=0 in the boost operation, the pulse waveform Srech having any one of the values −1, 1 corresponds to the non-conduction of the switch Sc, and the pulse waveform Srech having a value of 0 corresponds to the conduction of the switch Sc.

By obtaining a Fourier coefficient of the pulse waveform Srecb (the details will be described below), a harmonic current caused by switching of the switch Sc is analyzed. FIGS. 6 and 7 are graphs illustrating the relationship between the order and the amplitude (hereinafter also referred to as "harmonic amplitude") of the harmonic component of the current irec1 when the power frequency is a fundamental frequency. The amplitudes are normalized by the amplitudes of the fundamental frequency components of the current irec1.

Both FIGS. 6 and 7 are graphs related to the PWM modulation using the carriers Cp, Cn illustrated in FIG. 5. FIG. 6 illustrates the harmonic amplitude by a polygonal line when the modulation factor ks is 1. FIG. 7 illustrates the harmonic amplitude when the modulation factor ks is 0.5, that is, when the minimum value of the signal wave drecb is −0.5 and the maximum value is 0.5 by polygonal lines. As understood from the comparison between FIGS. 6 and 7, the magnitude of the harmonic amplitude and the distribution thereof are affected by the modulation factor ks.

The effect can be explained in other viewpoints as follows. The duty drec is indirectly controlled by the control of the duty dc. As understood from the principle of PWM modulation and FIG. 5, the waveform of the signal wave drecb can be approximately obtained by controlling the pulse waveform Srecb. The signal wave drecb can be treated as the waveform of the current irec1 as far as the analysis of high-order harmonics is concerned. In this way, the modulation factor ks is controlled by controlling the duty dc, and the distribution and the amplitude of the high-order harmonics in the current irec1 and the alternating current Iin are controlled.

When the alternating-current load 6 functions as a constant current load, the direct current Idc supplied to the inverter 5 does not fluctuate. At this time, an increase or decrease in the duty dc also affects the amplitude of the current irec1 itself. This is because the current ic increases as the duty dc increases, and the current irec1 is small when the direct current Idc does not fluctuate, as is understood from Math. (1). For example, when the duty dc has a value of 0, the current ic also has a value of 0, and the modulation factor ks has a value of 1. At this time, the voltage utilization ratio R has a value of 1 (i.e., Vdc=Vm). For example, when the duty dc has a value of 1, the current irec1 has a value of 0, and the modulation factor ks has a value of 0. At this time, the voltage utilization ratio R is equal to the boost ratio α (i.e., Vdc=Vc).

Each of FIGS. 8, 9, and 10 is a graph illustrating the harmonic amplitude with respect to the frequency by a polygonal line. FIG. 11 is a graph illustrating the relationship between the modulation factor ks and the harmonic amplitude. However, unlike FIGS. 5 to 7, FIGS. 8 to 11 illustrate a case where the frequencies (hereinafter, also referred to as "converter-side carrier frequencies") of the carriers Cp, Cn are 4.5 kHz and are 90 times the fundamental frequencies. It is assumed that the direct current Idc supplied to the inverter 5 does not fluctuate.

Each of FIGS. 8, 9, and 10 illustrates the harmonic amplitude at the converter-side carrier frequency and in the vicinity thereof. FIG. 8, FIG. 9, and FIG. 10 illustrate the harmonic amplitudes when the modulation factor ks has a value of 0.2, a value of 0.6, and a value of 1.0, respectively.

In FIG. 11, a polygonal line G31 indicates the harmonic amplitude of the frequency having the value (fc−fs) when the converter-side carrier frequency is fc=4.5 kHz and the fundamental frequency is the power frequency fs=50 Hz. This is also equal to the harmonic amplitude of the frequency having the value (fc+fs). Hereinafter, the harmonic of the frequency having the value (fc−fs) is temporarily referred to as a first-order sideband harmonic.

In FIG. 11, a polygonal line G33 indicates the harmonic amplitude of the frequency having the value (fc−3·fs). This is also equal to the harmonic amplitude of the frequency having the value (fc+3·fs). In the following, the harmonic of the frequency having the value (fc−3·fs) is temporarily referred to as a third-order sideband harmonic.

In FIG. 11, a polygonal line G35 indicates the harmonic amplitude of the frequency having the value (fc−5·fs). This is also equal to the harmonic amplitude of the frequency having the value (fc+5·fs). In the following, the harmonic of the frequency having the value (fc−5·fs) is temporarily referred to as a fifth-order sideband harmonic.

For example, the duty do is set to the value (Vrec−Vdc)/ (Vrec−Vc), and the duty drec is set to the value (Vdc−Vc)/ (Vrec−Vc)(Vc≥Vdc≥Vrec: see, for example, Math. (9) and (10) of Japanese Patent No. 6418287). When the duty dc=0, Vdc=Vrec, and when the duty dc=1, Vdc=Vc.

When the modulation factor ks has a value of 0, the duty drec=0 and the current irec1=0, and the duty dc=1 and there is no switching operation of the switch Sc, and there are also no harmonics due to it. Therefore, when the modulation factor ks has a value of 0, all of the first-order sideband harmonic, the third-order sideband harmonic, and the fifth-order sideband harmonic have a value of 0.

Over substantially all the values of the modulation factor ks (the modulation factor ks less than substantially the value of 0.98), the harmonic amplitude of the first-order sideband harmonic is larger than both the harmonic amplitude of the third-order sideband harmonic and the fifth-order sideband harmonic.

As the modulation factor increases, both the harmonic amplitude of the third-order sideband harmonic and the harmonic amplitude of the fifth-order sideband harmonic increase monotonically. The harmonic amplitude of the first-order sideband harmonic has a local maximum value with respect to the modulation factor. The value of the modulation factor ks that gives the local maximum value to the first-order sideband harmonic is ⅓ according to the approximate calculation described below.

From the viewpoint of reducing high-order harmonics of the power converter 100, for example, the duty dc is controlled by avoiding the modulation factor ks at which the harmonic amplitude of the first-order sideband harmonic has a local maximum value.

Each of FIGS. 12, 13, and 14 is a graph illustrating the harmonic amplitude with respect to the frequency by a polygonal line. Similarly to FIGS. 8 to 11, FIGS. 12 to 14 also illustrate the case where the converter-side carrier frequency fc is 4.5 kHz and is 90 times the fundamental frequency (which is equal to the power frequency fs). However, unlike FIGS. 8 to 11, the case where a saw-tooth wave is adopted as the carriers Cp, Cn is illustrated. Also in this case, it is assumed that the direct current Idc supplied to the inverter 5 does not fluctuate.

Each of FIGS. 12, 13, and 14 illustrates the harmonic amplitude at the converter-side carrier frequency and in the vicinity thereof. FIG. 12, FIG. 13, and FIG. 14 illustrate the harmonic amplitudes when the modulation factor ks has a value of 0.2, a value of 0.6, and a value of 1.0, respectively.

FIG. 15 is a graph illustrating the relationship between the modulation factor ks and the harmonic amplitude when saw-tooth waves are used as the carriers Cp, Cn. In FIG. 15, polygonal lines G41, G43, G45 indicate the harmonic amplitude of the first-order sideband harmonic, the harmonic amplitude of the third-order sideband harmonic, and the harmonic amplitude of the fifth-order sideband harmonic, respectively.

FIGS. 8 to 11 correspond to FIGS. 12 to 15, respectively, and the difference between these two groups results from the waveforms of the carriers Cp, Cn. The distribution of the high-order harmonics is wider and the harmonic amplitude of the first-order sideband harmonics is smaller in the case where the saw-tooth waves are used for the carriers Cp, Cn (FIGS. 12 to 15) than in the case where the symmetric triangular waves are used for the carriers Cp, Cn (FIGS. 8 to 11) (see the polygonal line G31 in FIG. 11 and the polygonal line G41 in FIG. 15).

Figure 16:
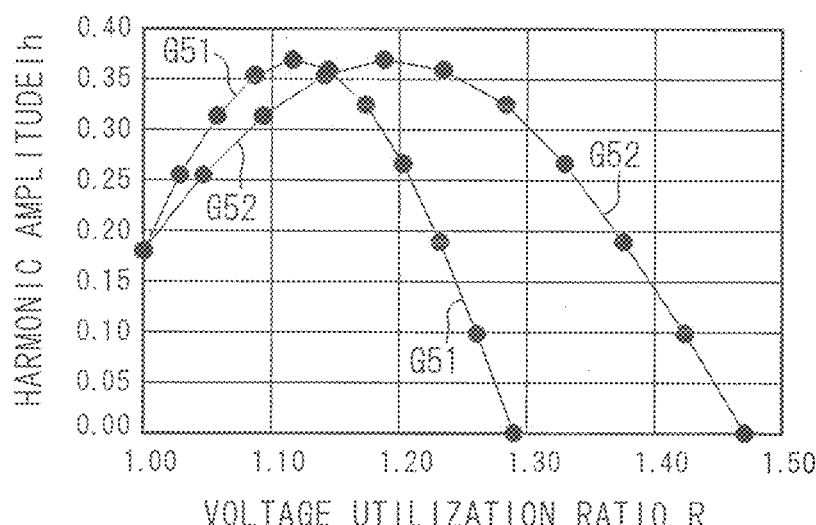
FIG. 16 is a graph illustrating the dependency of a harmonic amplitude on a voltage utilization ratio.

FIG. 16 is a graph illustrating the dependency of a harmonic amplitude Ih of the first-order sideband harmonic on the voltage utilization ratio R. A polygonal line G51 indicates the case where the boost ratio α has a value of 1.29. A polygonal line G52 indicates a case where the boost ratio α has a value of 1.47. FIG. 16 corresponds to the polygonal line G31 in FIG. 11, but the horizontal axis is different from that in FIG. 11. The circles illustrated in FIG. 16 correspond to the circles illustrated in FIG. 11.

When the modulation factor ks=1 in FIG. 11, Vdc=Vm, and the voltage utilization ratio R has a value of 1 in FIG. 16 (corresponding to the circles at the left ends of polygonal lines G51, G52: they coincide with each other). In FIG. 11, when the modulation factor ks=0, Vdc=Vc, and the voltage utilization ratio R is equal to the boost ratio α (corresponding to the circles at the right ends of the polygonal lines G51, G52).

As described above, the fundamental wave component of the current irec1 is expressed by ks·irec by introducing the modulation factor ks. As far as the harmonics are concerned, the amplitude Cm of the carriers Cp, Cn is introduced, and ks·sin(ωt)·Cm can be adopted for the signal wave drech. In the above description, since Cm=1 is treated, the amplitude of the current irec1 is also treated as 1, and has the same value as the duty drec. Considering that the current irec exhibits a full-wave rectified waveform, the duty drec and the absolute value ks·|sin(ωt)| of the signal wave drecb have the respective peak values at both of the phases ωt=Π/2 and Π/2, and both peak values coincide with each other (ks=drec).

Since |sin(ωt)|=1 and Vrec=Vm at both of the phases ωt=Π/2 and 3Π/2, the duty drec adopted when the equivalent direct-current voltage Vdc is constant regardless of the phase ωt has the following value: ks=drec=(Vdc−Vc)/(Vm−Vc)=(α−R)/(α−1). Therefore, the relationship of R=ks+(1−ks)α is established.

For example, the fourth circle from the right of the polygonal line G51 corresponds to ks=0.3, and R=1.203 in consideration of α=1.29. The fourth circle from the left of the polygonal line G51 corresponds to ks=0.7, and R=1.087 in consideration of α=1.29.

The voltage utilization ratio R is a ratio of the equivalent direct-current voltage Vdc to the peak value Vm, and the peak value Vm is normally assumed to be constant. Therefore, the large voltage utilization ratio R indicates the large equivalent direct-current voltage Vdc. On the other hand, the harmonic amplitude illustrated in FIG. 11 is normalized by the amplitude of the fundamental frequency component (the component at the power frequency fs) of the current irec1.

The harmonic amplitude Ih illustrated in FIG. 16 indicates a value in a case where the instantaneous power Pout (=Pdc) increases as the voltage utilization ratio R increases.

The dependency of the harmonic amplitude of the first-order sideband harmonic on the voltage utilization ratio R when the instantaneous power Pout is maintained at a predetermined value is obtained as follows. First, in order to normalize the equivalent direct-current voltage Vdc, the quotient obtained by dividing the harmonic amplitude Ih by the voltage utilization ratio R is assumed. Further, in consideration of the effect of a reduction by the filter 2, the product of the quotient and a coefficient G Illustrated in the following Math. (6) is assumed. An inductance value L of the reactor L4 and an electrostatic capacity C of the capacitor C2 are introduced.

[Math. 6]

$$G = \left[\{1 - (\omega_d/\omega 0)^2\}^2\right]^{-1/2}, \ \omega 0^2 = L \cdot C, \ \omega_d = 2\pi(fc - fs) \tag{6}$$

The limit value of the low-voltage high-order harmonic is represented by a voltage value detected at a predetermined LISN. The above-described product is further multiplied by the direct current Idc in order to obtain the harmonic amplitude for the actually flowing current value instead of the harmonic amplitude for the normalized current value. Idc=Pdc/Vm, and Pdc=Pout. Therefore, a harmonic amplitude Ih' of the first-order harmonic sideband in a case where the instantaneous power Pout is constant, which is converted into the value of the actually flowing current, is obtained by the following Math. (7).

[Math. 7]

$$Ih' = (Ih/R) \cdot G \cdot (Pout/Vm) \tag{7}$$

Figure 17:
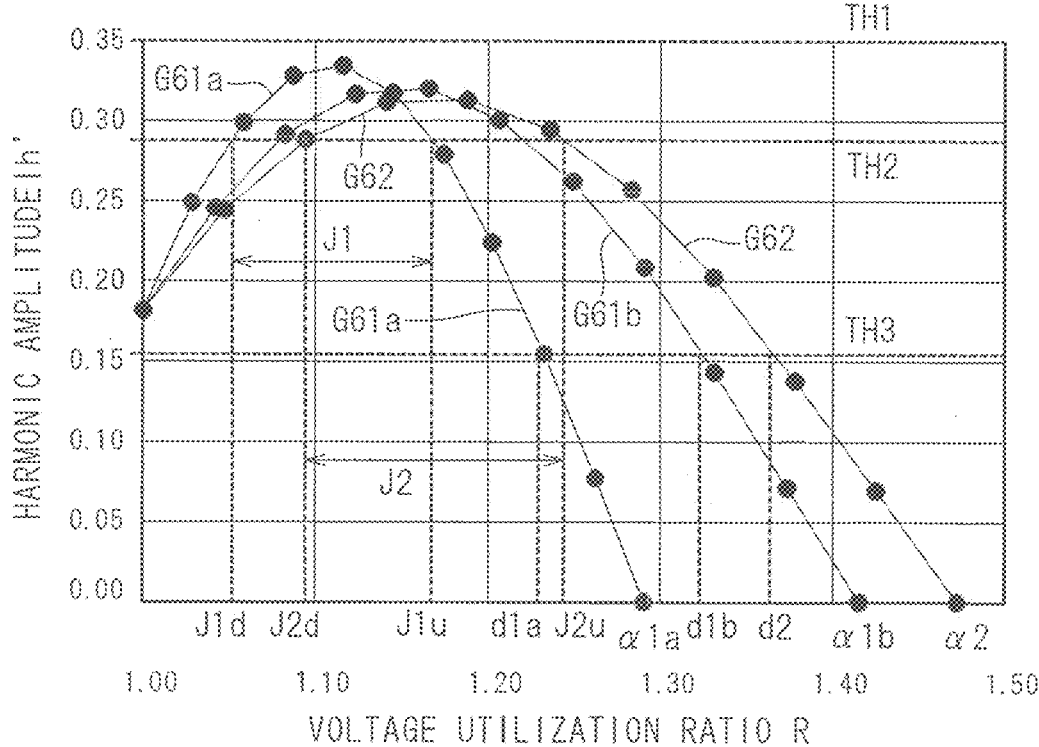
FIG. 17 is a graph illustrating the dependency of a harmonic amplitude on a voltage utilization ratio.

FIG. 17 is a graph illustrating the dependency of the harmonic amplitude Ih' on the voltage utilization ratio R. For the sake of simplicity, it is assumed that the boost ratio α is able to have any value from 1.29 to 1.47. The boost ratio α may have a value less than 1.29 or a value more than 1.47.

A polygonal line G61$a$ indicates a case where the boost ratio α has a value of α1$a$=1.29. A polygonal line G61$b$ indicates a case where the boost ratio α has a value of α1$b$=1.41. A polygonal line G62 indicates a case where the boost ratio α has a value of α2=1.47. In any of the polygonal lines G61$a$, G61$b$, G62, the circles indicate the duty dc (or the duty drec) in increments of 0.1, similarly to the circles illustrated in FIG. 16.

As the boost ratio α increases, the local maximum value of the harmonic amplitude Ih' decreases, and the voltage utilization ratio R that gives the local maximum value increases. Further, when the harmonic amplitude Ih' of the same value is obtained at the different boost ratio α, the voltage utilization ratio R giving the value increases as the boost ratio α increases. When R=1, the harmonic amplitude Ih' has a value of 1 independently of the boost ratio α. When R=α, the harmonic amplitude Th' has a value of 0 independently of the boost ratio α.

Thresholds TH1, TH2, TH3 are also illustrated in FIG. 17. Each of the thresholds TH1, TH2, TH3 exemplifies a limit value in the standard of the low-voltage system high-order harmonic (TH1>TH2>TH3). The limit value is set dependently on the frequency. As can be seen from FIGS. 11 and 15, the harmonic amplitude Ih' of the first-order harmonic sideband is the main low-voltage system high-order harmonic. Therefore, hereinafter, a case where the limit value set for the frequency having the value (fc-fs) is any one of the thresholds TH1, TH2, TH3 will be described as an example.

The threshold TH1 is more than the harmonic amplitude Ih' regardless of the voltage utilization ratio R in any of 1.29≤α>1.47. When the threshold TH1 has the limit value, the harmonic amplitude Ih' is suppressed to be less than the limit value regardless of how the boost ratio α and the voltage utilization ratio R are set as long as 1.29≤α≤1.47 and 1≤R≤α.

The polygonal line G61$a$ indicates that TH2≤Ih' when J1$d$≤R≤J1$u$. The polygonal line G62 indicates that TH2≤Ih' when J2$d$≤R≤J2$u$. These can also be explained as follows.

When the boost ratio α has a value ola (=1.29), the harmonic amplitude Ih' is equal to or more than the threshold TH2 at the voltage utilization ratio R in the range J1. The harmonic amplitude Ih' is less than the threshold TH2 at the voltage utilization ratio R outside the range J1. A lower limit J1$d$ (about 1.04) of the range J1 is more than 1, and an upper limit J1$u$ (about 1.16) of the range J1 is less than the value α1$a$.

When the boost ratio α has a value α2 (=1.47), the harmonic amplitude Ih' is equal to or more than the threshold TH2 at the voltage utilization ratio R in the range J2. The harmonic amplitude Ih' is less than the threshold TH2 at the voltage utilization ratio R outside the range J2. A lower limit J2$d$ (about 1.09) of the range J2 is more than the lower limit J1$d$, and an upper limit J2$u$ (about 1.24) of the range J2 is more than the upper limit J1$u$ and less than the value α2.

In a case where the threshold TH2 is the limit value and the voltage utilization ratio R is more than the upper limit J2$u$, the harmonic amplitude Ih' is less than the limit value even when the boost ratio α has any value from the value ola to the value α2.

At this time, it is desirable that the boost ratio α have the value α2 for any voltage utilization ratio R. This is because the equivalent direct-current voltage Vdc becomes higher without decreasing the duty drec from the viewpoint of increasing the efficiency. Setting the higher equivalent direct-current voltage Vdc facilitates high-speed operation of the electric motor when the alternating-current load 6 is a three-phase motor, for example.

The control in which the voltage utilization ratio R is set to be more than the upper limit J2$u$ and the boost ratio α is increased in this way may be temporarily referred to as first control below. The first control is realized by increasing the duty dc at the power phase of Π/2, 3Π/2 and increasing the capacitor voltage Vc.

When the threshold TH2 has the limit value and the voltage utilization ratio R is more than the upper limit Ju and is equal to or less than the upper limit J2$u$, it is desirable that the boost ratio α have α1$a$. This is because the harmonic amplitude Ih' is less than the limit value for any voltage utilization ratio R at this time. Hereinafter, the control in which the voltage utilization ratio R is set to be more than the upper limit J1$u$ and equal to or less than the upper limit J2$u$ and the boost ratio α is decreased may be temporarily referred to as a second control. The second control is realized by setting the duty dc at the power phase of Π/2, 3Π/2 and decreasing the capacitor voltage Vc.

When the threshold TH2 has the limit value and the voltage utilization ratio R is equal to or more than the lower limit J1$d$ and is less than the lower limit J2$d$, it is desirable that the boost ratio α have α2. This is because the harmonic amplitude Ih' is less than the limit value for any voltage utilization ratio R at this time.

The control in which the voltage utilization ratio R is set to be equal to or more than the lower limit J1*d* and less than the lower limit J2*d* and the boost ratio α is increased as described above may be temporarily referred to as third control below. The third control is realized by decreasing the duty dc at the power phase of Π/2, 3Π/2 and increasing the capacitor voltage Vc.

When the threshold TH2 has the limit value and the voltage utilization ratio R is less than the lower limit J1*d*, the harmonic amplitude Ih' is less than the limit value regardless of whether the boost ratio α is the value α1*a* or α2. In this case, when the boost ratio α has the value α1*a*, the booster 4*b* is more efficient and the power converter 100 is more efficient than when the boost ratio α has the value α2.

The control in which the voltage utilization ratio R is set to be less than the lower limit J1*d* and the boost ratio α is increased as described above may be temporarily referred to as fourth control below. The fourth control is realized by decreasing the duty dc at the power phase of Π/2, 3Π/2 and decreasing the capacitor voltage Vc.

In the fourth control, it is desirable that the duty dc have a value less than the value dc2. Here, the value dc2 is the value of the duty dc in a case where the voltage utilization ratio R has the lower limit J1*d* when the boost ratio α has the value α2.

The value of the duty dc needed to obtain the same voltage utilization ratio R is larger when the boost ratio has the value ola than when the boost ratio α has the value α2. Therefore, the duty dc being less than the value dc2 contributes to reducing the possibility that the harmonic amplitude Ih' exceeds the limit value. Reducing the duty dc also contributes to increasing the efficiency of the power converter 100.

The polygonal line G61*a* indicates TH3≤Ih' when R≤d1*a*. The polygonal line G62 indicates TH3≤Ih' when R≤d2. These can also be explained as follows.

When the boost ratio α has the value α1*a*, the harmonic amplitude Ih' is equal to or more than the threshold TH3 with respect to the voltage utilization ratio R equal to or less than the lower limit value d1*a*. The harmonic amplitude Ih' is less than the threshold TH3 with respect to the voltage utilization ratio R more than the lower limit value d1*a*.

When the boost ratio α has the value α2, the harmonic amplitude Ih' is equal to or more than the threshold TH3 with respect to the voltage utilization ratio R equal to or less than the lower limit value d2. The harmonic amplitude Ih' is less than the threshold TH3 with respect to the voltage utilization ratio R more than the lower limit value d2.

When R≥d1*a*, the harmonic amplitude Ih' monotonously decreases regardless of the boost ratio α. When α=α1*a*, R=α1*a* and Ih'=0, and when α=α2, R=d2 and Ih'>0. Therefore, α1*a*<d2. d1*a*<α1*a*, and d1*a*<d2.

When the threshold TH3 has the limit value and the voltage utilization ratio R is more than the lower limit value d1*a* and less than the value ola, it is desirable that the value α1*a* be adopted as the boost ratio α. This is because the harmonic amplitude Ih' is less than the limit value for any voltage utilization ratio R at this time.

The control in which the voltage utilization ratio R is set to be more than the lower limit value d1*a* and less than the value α1*a* and the boost ratio α is decreased as described above may be temporarily referred to as fifth control below. The fifth control is realized by setting the duty dc at the power phase of Π/2, 3Π/2 and decreasing the capacitor voltage Vc.

Next, the behavior of the harmonic amplitude Ih' with respect to the voltage utilization ratio R when the boost ratio α has the value of α1*b*=1.41 will be considered. The polygonal line G61*b* illustrates such behavior. There is a relationship of α1*a*<α1*b*<α2.

The polygonal line G61*b* indicates TH3≤Ih' when R≤d1*b*. This can also be explained as follows.

When the boost ratio α has the value α1*b*, the harmonic amplitude Ih' is equal to or more than the threshold TH3 with respect to the voltage utilization ratio R equal to or less than the lower limit value d1*b*. The harmonic amplitude Ih' is less than the threshold TH3 with respect to the voltage utilization ratio R more than the lower limit value d1*b*.

As illustrated in FIG. 17, there is a relationship of d1*a*<α1*a*<d1*b*<d2<α1*b*<α2. When the boost ratio α is not less than the value α1*b*, the cases are divided as follows. This is the same even when α1*b*=d2.

When the voltage utilization ratio R is more than the lower limit value dib and less than the lower limit value d2, it is desirable that the boost ratio α have the value alb. This is because, in this case, the harmonic amplitude Ih' is less than the limit value for any voltage utilization ratio R.

The control in which the voltage utilization ratio R is set to be more than the lower limit value dib and less than the lower limit value d2 and the boost ratio α is decreased as described above may be temporarily referred to as sixth control below. The sixth control is realized by setting the duty dc at the power phase of Π/2, 3Π/2 and decreasing the capacitor voltage Vc.

When the voltage utilization ratio R is equal to or more than the lower limit value d2, it is desirable that the boost ratio α have the value α2. This is because the equivalent direct-current voltage Vdc becomes higher without decreasing the duty drec from the viewpoint of increasing the efficiency. Setting the higher equivalent direct-current voltage Vdc facilitates high-speed operation of the electric motor when the alternating-current load 6 is a three-phase motor, for example.

The control for increasing the voltage utilization ratio R and increasing the boost ratio α in this way may be temporarily referred to as seventh control below. The seventh control is realized by increasing the duty dc at the power phase of Π/2, 3Π/2 and increasing the capacitor voltage Vc.

Hereinafter, the case where the alternating-current load 6 is a three-phase motor will be described.

<Description of Velocity Detection Unit 9>

A velocity detection unit 9 receives the alternating currents Iu, Iv, Iw and obtains the currents Id, Iq and a rotational angular velocity ωm of the alternating-current load 6. Currents Id, Iq are the currents obtained by converting alternating currents Iu, Iv, Iw into what is called a dq-axis coordinate system.

<Description of Control Device 10>

FIG. 18 is a block diagram illustrating an example of a conceptual configuration of a control device 10 that controls the power converter 100. The control device 10 includes a block 10*a* that functions as a control device for the active buffer 4 and a block 10*b* that functions as a control device for the inverter 5.

The block 10*a* includes a current distribution ratio generation unit 11, a voltage command generation unit 15, an adder 13, a chopper control unit 16, comparators 12, 14, and carrier generation units 23, 24.

The block 10*b* includes an output voltage command generation unit 31, calculation units 32, 33, comparators 34, 35, and a logical OR/logical AND calculation unit 36.

The current distribution ratio generation unit 11 receives the peak value Vm which is also the amplitude of the alternating-current voltage Vin, an amplitude Im of the alternating current Iin, a command value Vdc* for the equivalent direct-current voltage Vdc, a command value Vc* for the capacitor voltage Vc, and a power angular velocity ω. The peak value Vm, the amplitude Im, and the power angular velocity ω are detected, for example, by providing a known detection unit, and are input to the current distribution ratio generation unit 11. The command values Vdc*, Vc* are input from the voltage command generation unit 15.

The current distribution ratio generation unit 11 outputs the duties drec, dc, dz and a command value (hereinafter, also referred to as a "current command value") iL* for the current iL. The current distribution ratio generation unit 11 determines the duties drec, dc, dz such that the equivalent direct-current voltage Vdc follows the command value Vdc* and determines the current command value iL* such that the capacitor voltage Vc follows the command value Vc*.

The voltage command generation unit 15 receives command values Vd*, Vq* and the currents Id, Iq to obtain the instantaneous power Pout. The command values Vd*, Vq* are command values of the voltages Vd, Vq, respectively. The voltages Vd, Vq are voltages obtained by converting the three-phase voltages output from the inverter 5 into what is called a dq-axis coordinate system. The currents Id, Iq are currents obtained by converting the alternating currents Iu, Iv, Iw into what is called a dq-axis coordinate system. For example, Pout=Vd*·Id+Vq*·Iq. The voltage command generation unit 15 determines the command values Vdc*, Vc* in accordance with the instantaneous power Pout. The command values Vd* and Vq* are obtained from the output voltage command generation unit 31, and the currents Id, Iq are obtained from the velocity detection unit 9.

The duty drec and the duty dz are added in the adder 13, and the result (drec+dz) is compared with a carrier C1 in the comparator 12. The carrier C1 is generated by the carrier generation unit 23 and is, for example, a triangular wave having a minimum value of 0 and a maximum value of 1.

The comparison result of the comparator 12 is output as a switching signal SSc to be supplied to the switch Sc. For example, the comparator 12 outputs, as the switching signal SSc, the signal activated in a period in which the carrier C1 is equal to or more than the value (drec+dz). A transistor Qc (the equivalent switch Sc) is turned on by the activation of the switching signal SSc.

The chopper control unit 16 receives the peak value Vm, the power angular velocity ω (or the alternating-current voltage Vin), and the command value Vc* and, from them and an inductance Im of the reactor L4, outputs a duty dL based on the current command value iL*. A technique for determining the duty dL from the given current command value iL*, the capacitor voltage Vc, the alternating-current voltage Vin, and the inductance Lm is known, for example, from Japanese Patent No. 5772915 and Japanese Patent No. 5629885. Since the capacitor voltage Vc is controlled so as to follow the command value Vc*, the chopper control unit 16 can be easily realized by referring to, for example, Japanese Patent No. 5772915 and Japanese Patent No. 5629885.

The duty dL is compared with a carrier C3 in the comparator 14. The carrier C3 is generated by the carrier generation unit 24 and is, for example, a triangular wave having a minimum value of 0 and a maximum value of 1. The comparison result of the comparator 14 is output as a control signal SSL for controlling the opening and closing of the switch SL. For example, the comparator 14 outputs, as the control signal SSL, the signal activated in a period in which the carrier C3 is equal to or less than the duty dL. The transistor QL (the equivalent switch SL) is turned on by the activation of the control signal SSL.

The output voltage command generation unit 31 generates the command values Vd*, Vq* and phase voltage commands Vu*, Vv*, Vw*. In the example of FIG. 18, the rotational angular velocity ωm of the alternating-current load 6 and a command value ωm* thereof are input to the output voltage command generation unit 31. The rotational angular velocity ωm is obtained by the velocity detection unit 9, and the command value ωm* is input by an external configuration (not illustrated). The output voltage command generation unit 31 generates the command values Vd*, Vq* and the phase voltage commands Vu*, Vv*, Vw* by a known method so as to reduce the deviation between the rotational angular velocity ωm and the command value ωm* thereof.

For example, the output voltage command generation unit 31 receives the rotational angular velocity ωm, the command value ωm*, and the currents Id, Iq and generates a modulation factor D and a phase φ (not illustrated) of the voltage output from the inverter 5. The phase voltage commands Vu*, Vv*, Vw* and the command values Vd*, Vq* are generated using the modulation factor D and the phase φ. This technique can be regarded as, for example, a combination of the function of the velocity control unit 1010 and the function of the output voltage command unit 1011 disclosed in Japanese Patent No. 6721097.

The calculation unit 32 receives the duties drec, dz, dc and the phase voltage commands Vu*, Vv*, Vw*. The calculation unit 32 calculates and outputs a value (drec+dz+dc·Vx*) (where x represents u, v, and w). The calculation unit 33 receives the duty drec and the phase voltage commands Vu*, Vv*, Vw* and calculates and outputs a value (drec·(1−Vx*)).

The value (drec+dz+dc·Vx*) is compared with the carrier C1 in the comparator 34, and the value (drec. (1−Vx*)) is compared with the carrier C1 in the comparator 35. The comparator 34 outputs the signal activated, for example, in a period in which the carrier C1 is equal to or more than the value (drec+dz+dc·Vx*), and the comparator 35 outputs the signal activated, for example, in a period in which the carrier C1 is equal to or less than the value (drec·(1−Vx*)).

As described above, since the carrier C1 can be used for both the blocks 10_a_ and 10_b_, the carrier generation unit 23 is illustrated to be provided across the boundary between the blocks 10_a_ and 10_b_ in FIG. 2.

The comparison results of the comparators 34, 35 are input to the logical OR/logical AND calculation unit 36. The logical OR of the comparison results of the comparators 34, 35 is output as switching signals SSup, SSvp, SSwp to be supplied to the switching elements Sup, Svp, Swp, respectively, and the negative OR thereof is output as switching signals SSun, SSvn, SSwn to be supplied to the switching elements Sun, Svn, Swn, respectively.

A technique for generating the switching signals SSup, SSvp, SSwp, SSun, SSvn, SSwn based on the duties drec, dz, dc and the phase voltage commands Vu*, Vv*, and Vw* as described above is well known, and thus detailed descriptions of the technique will be omitted.

<Selective Use of Various Control Methods>

Figure 19:
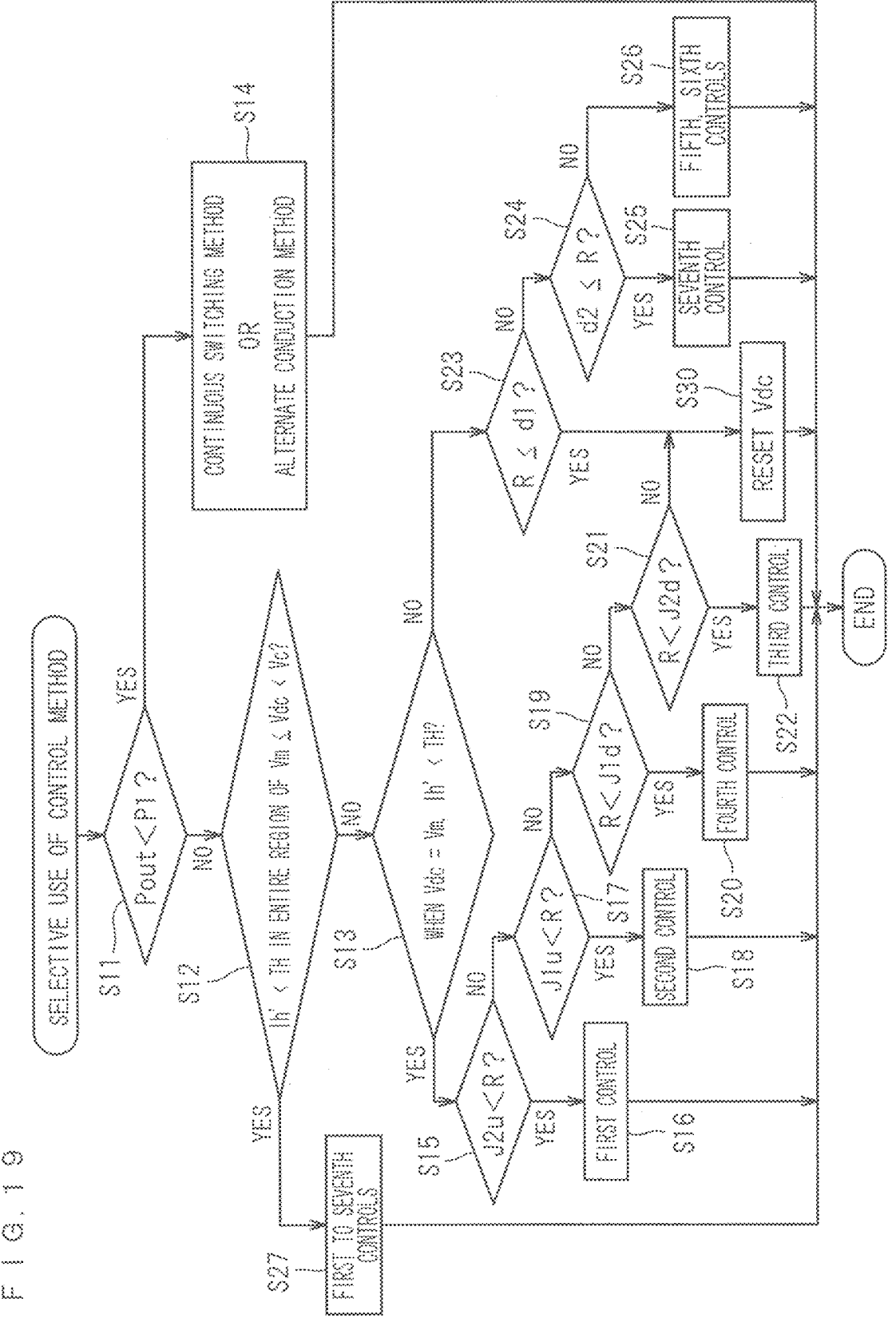
FIG. 19 is a flow chart illustrating a routine for selectively using a control method of the power converter.

FIG. 19 is a flow chart illustrating a routine for selectively using a control method of the power converter 100 by the control device 10. As described above, the operation of the power converter 100 can be controlled by controlling one or both of the capacitor voltage Vc and the duty dc that control the operation of the power converter 100.

In step S11, it is determined whether the instantaneous power Pout is less than a certain threshold P1. The threshold P1 corresponds to the second threshold described in (b-3). When the instantaneous power Pout is less than the threshold P1, the determination result in step S11 is positive, and step S14 is executed. When step S14 is executed because the determination result in step S11 is positive, it is not necessary to increase the equivalent direct-current voltage Vdc, and the non-boost control is adopted. In step S14, for example, a continuous switching method or an alternate conduction method is employed as the non-boost control.

The term "alternate conduction method" is a temporary name in the present embodiment for the control in which the non-conduction period in which the duty dc is 0 and the conduction period in which the duty dc is positive are alternately provided. The alternate conduction method is realized, for example, by controlling one or both of the duty dc and the capacitor voltage Vc.

The alternate conduction method includes a half-cycle switching method. The "half-cycle switching method" is introduced in Japanese Unexamined Patent Publication No. 2021-58002 using Japanese Patent No. 5629885 as an example as the control for charging and discharging the instantaneous power Pbuf by the active buffer 4 for each half cycle of the alternating-current voltage Vin. In the half-cycle switching method, each of the non-conduction period and the conduction period has a length of a quarter of the power cycle, that is, a quarter cycle of the alternating-current voltage Vin.

The "continuous switching method" is introduced in Japanese Unexamined Patent Publication No. 2021-58002 using Japanese Patent No. 5804167 as an example as the control for continuously charging and discharging by the active buffer 4 without setting an exclusive period in the power phase of the alternating-current voltage Vin. In the continuous switching method, for example, control is performed such that the length of the non-conduction period is substantially 0.

The half-cycle switching method and the continuous switching method are advantageous from the viewpoint of increasing the efficiency of the power converter 100.

In the alternate conduction method, the duty dc may be 0 in a first section in which the command value Vdc* of the equivalent direct-current voltage Vdc is higher than the absolute value of the alternating-current voltage Vin, and the value obtained by dividing the command value Vdc* of the equivalent direct-current voltage Vdc by the rectified voltage Vrec may be adopted as the duty drec. The first section can be regarded as a non-conduction period. In a second section in which the command value Vdc* is equal to or less than the absolute value of the alternating-current voltage Vin, 0 is adopted as the duty drec, and the value obtained by dividing the command value Vdc* by the peak value Vm is adopted as the duty dc. The second section can be regarded as a conduction period. Such a control method is disclosed in, for example, Japanese Unexamined Patent Publication No. 2021-58002 (hereinafter temporarily referred to as "zeroth control"). According to the zeroth control, the equivalent direct-current voltage Vdc corresponding to the command value Vdc* is obtained regardless of the power phase.

When the equivalent direct-current voltage Vdc is the same, typically, the half-cycle switching method is advantageous in that the power capacity required for the active buffer 4 is smaller and the effective value of the current for charging the capacitor C4 is smaller than those of the continuous switching method, and thus the efficiency in the partial load is improved. By adopting the zeroth control, the capacitor C4 is charged without switching in the booster 4b, so that further improvement of the efficiency in the partial load can be expected.

When it is determined in step S11 that the instantaneous power Pout is equal to or more than the certain threshold P1, the determination result in step S11 is negative, and the boost control is performed. When the determination result in step S11 is negative, the control method of the power converter 100 is selected in accordance with the determination results in steps S12 and S13.

In steps S12, S13, a limit threshold TH for the harmonic amplitude Ih' is introduced as a determination criterion. In the example according to the present embodiment, the limit threshold TH corresponds to any one of the above-described thresholds TH1, TH2, TH3 (see FIG. 17).

Prior to the execution of step S13, step S12 is executed. In step S12, when the equivalent direct-current voltage Vdc is equal to or more than the peak value Vm and is less than the capacitor voltage Vc, it is determined whether the harmonic amplitude Ih' is always less than the limit value.

Referring to FIG. 17, when TH=TH1, the determination result in step S12 is positive. In this case, the control method of the power converter 100 can be selected from the viewpoint other than the harmonic amplitude Ih', for example, from the viewpoint of increasing the efficiency or from the viewpoint of increasing the voltage utilization ratios R, and then, step S27 described below is executed, and the selective use of the control method is ended.

Referring to FIG. 17, when TH=TH2 or TH=TH3, the determination result in step S12 is negative, and step S13 is executed.

In step S13, it is determined whether the harmonic amplitude Ih' when the equivalent direct-current voltage Vdc is the peak value Vm, that is, when the voltage utilization ratio R is a value of 1, is less than the limit value. Referring to FIG. 17, when TH=TH2, the determination result in step S13 is positive, and when TH=TH3, the determination result in step S13 is negative.

When the determination result in step S13 is positive, any of the first control, the second control, the third control, and the fourth control can be employed for the control of the power converter 100, as described in the description of the case where the threshold TH2 is the limit value.

When the determination result in step S13 is positive, step S15 is executed. In step S15, it is determined whether the equivalent direct-current voltage Vdc is more than the peak value Vm multiplied by the upper limit J2$u$. In FIG. 19, the determination criterion in step S15 is abbreviated using the voltage utilization ratio R. When the determination result in step S15 is positive, the first control is adopted in step S16. Step S16 is executed, and the selective use of the control method is finished.

When the determination result in step S15 is negative, step S17 is executed. In step S17, it is determined whether the equivalent direct-current voltage Vdc is more than the peak value Vm multiplied by the upper limit J1$u$. In FIG. 19, the determination criterion in step S17 is abbreviated using the voltage utilization ratio R.

When step S17 is executed, R≤J2$u$ has already been determined in step S15. Therefore, when the determination result in step S17 is positive, the second control is adopted in step S18. Step S18 is executed, and the selective use of the control method is finished.

When the determination result in step S17 is negative, step S19 is executed. In step S19, it is determined whether the equivalent direct-current voltage Vdc is less than the peak value Vm multiplied by the lower limit J1*d*. In FIG. 19, the determination criterion in step S19 is abbreviated using the voltage utilization ratio R. When the determination result in step S19 is positive, the fourth control is adopted in step S20. Step S20 is executed, and the selective use of the control method is finished.

When the determination result in step S19 is negative, step S21 is executed. In step S21, it is determined whether the equivalent direct-current voltage Vdc is more than the peak value Vm multiplied by the lower limit J2*d*. In FIG. 19, the determination criterion in step S21 is abbreviated using the voltage utilization ratio R.

When step S21 is executed, J1*d*≤R has already been determined in step S19. Therefore, when the determination result in step S21 is positive, the third control is adopted in step S22. Step S22 is executed, and the selective use of the control method is finished.

When the determination result in step S21 is negative, J2*d*≤R≤J1*u*. The adoption of the voltage utilization ratio R results in TH2≤Ih', which is not desirable. Therefore, the equivalent direct-current voltage Vdc is reset in step S30. Step S30 is executed, and the selective use of the control method is finished.

When the determination result in step S13 is negative, any of the fifth control, the sixth control, and the seventh control can be employed as described in the description of the case where the threshold TH3 is the limit value.

When the determination result in step S13 is negative, step S23 is executed. In step S23, it is determined whether the equivalent direct-current voltage Vdc is equal to or less than the peak value Vm multiplied by the lower limit value d1. The lower limit value d1 is a value representing the lower limit values d1*a*, d1*b* described above. In FIG. 19, the determination criterion in step S23 is abbreviated using the voltage utilization ratio R.

When the determination result in step S23 is positive, TH3≤Ih', which is not desirable. Therefore, the equivalent direct-current voltage Vdc is reset in step S30. Step S30 is executed, and the selective use of the control method is finished.

When the determination result in step S23 is negative, step S24 is executed. In step S24, it is determined whether the equivalent direct-current voltage Vdc is equal to or more than the peak value Vm multiplied by the lower limit value d2. In FIG. 19, the determination criterion in step S24 is abbreviated using the voltage utilization ratio R. When the determination result in step S24 is positive, the seventh control is adopted in step S25. Step S25 is executed, and the selective use of the control method is finished.

When the determination result in step S24 is negative, step S26 is executed, and the fifth control or the sixth control is adopted. When step S24 is executed, d1<R has already been determined in step S23. Therefore, when the determination result in step S24 is negative, d1<R<d2. In this case, the fifth control or the sixth control is selected depending on the magnitude relationship between the value α1 and the lower limit value d2. In FIG. 19, this selection is illustrated as step S26 labeled "fifth, sixth controls". Step S26 is executed, and the selective use of the control method is finished.

When the determination result in step S12 is positive, any of the first control to the seventh control described above can be adopted. In FIG. 19, this selection is illustrated as step S27 denoted by "first to seventh controls". Step S27 is executed, and the selective use of the control method is ended.

<Fourier Coefficient of Pulse Waveform Srecb>

The calculation for obtaining the Fourier coefficient of the pulse waveform Srecb illustrated in FIG. 5 is exemplified below. Since the pulse waveform Srecb is an odd function with a cycle of 2Π and an average value of 0, the phase ωt of the alternating-current voltage Vin is expressed as a phase θ and is expressed by Math. (8), (9). However, in Math. (9), the integral interval is 0 to Π/2 due to the symmetry of the waveform.

[Math. 8]

$$f(\theta) = \sum_{n=1}^{\infty} b_n \sin(n \cdot \theta) \tag{8}$$

[Math. 9]

$$b_n = \frac{4}{n \cdot \pi} [\cos(n \cdot \theta)]_{\theta_1, \ldots, \theta_k}^{\theta_2, \ldots, \pi/2} \tag{9}$$

At the phases $\theta_1$ to $\theta_{k+1}$ ($\theta_{k+1}$ is an even number equal to or less than Π/2), the carrier Cp and the signal wave drecb become equal. In FIG. 5, the case of $\theta_{k+1}$=Π/2 is illustrated. The phases $\theta_1$ to $\theta_{k+1}$ are obtained by, for example, numerical calculation.

The Fourier coefficient of the pulse waveform Srecb is obtained from the phases $\theta_1$ to $\theta_{k+1}$ and Math. (9), and the harmonic current caused by the switching of the switch Sc is analyzed.

<Modulation Factor Ks that Gives Local Maximum Value of Harmonic Amplitude Ih'>

It can be considered that the signal wave drecb is modulated by the fundamental wave component of the converter-side carrier frequency of the pulse waveform Srecb to generate harmonics. The harmonic amplitude Ih of the first-order sideband harmonic is represented by Math. (10). An amplitude NO is introduced into Math. (10). The amplitude NO is an average value of the fundamental wave amplitude of the converter-side carrier frequency of the pulse waveform Srecb over one cycle (2Π/ω) of the phase ωt. In this way, since the carrier frequency is regarded as an average value, cos (2Π·fc·t) in Math. (10) represents a fundamental wave component of a square wave signal having an amplitude of 1.

[Math. 10]

$$Ih = \pi 0 \cdot \cos(2\pi \cdot fc \cdot t) \cdot (4/\pi)\cos(2\pi \cdot fs \cdot t) \tag{10}$$

In the following, the calculation for determining the amplitude Π0 and then the modulation factor ks that gives the local maximum value of the harmonic amplitude Ih will be described.

Each of the pulse waveforms Srecb is a square wave and has a time ratio d that determines the width of the square wave with respect to a carrier cycle (1/fc) that is the cycle of the carriers Cp, Cn. The component of the converter-side carrier frequency of each of the square waves depends on the time ratio d of each of the square waves.

The width of the square wave depends on the phase in which the square wave is located. Referring to FIG. 5, the width of the square wave having a value of 1 in the phases $\theta 1$ to $\theta 2$ is narrower than the width of the square wave having a value of 1 in the vicinity of the phase $\Pi/2$.

FIG. 20 is a graph illustrating a pulse waveform $\Pi_j$ that rises at a phase $\theta_j$ and falls at a phase $\theta_{j+1}$ in a carrier cycle centered on a phase $(\theta_j+\theta_{j+1})/2$ (the subscript j is an odd number equal to or less than k). A time ratio $d_j$ of the pulse waveform $\Pi_j$ is obtained by Math. (11).

[Math. 11]

$$d_j = (\theta_{j+1} - \theta_j)/2\pi \tag{11}$$

By determining the Fourier coefficient of the pulse waveform $\Pi_j$, an amplitude $\Pi m_j$ of the component of the converter-side carrier frequency of the pulse waveform $\Pi_j$ is obtained by Math. (12).

[Math. 12]

$$\pi m_j = (2/\pi)\sin(d_j \cdot \pi) \tag{12}$$

FIG. 21 is a graph illustrating the relationship between the time ratio d; and the amplitude $\Pi m_j$. The amplitude $\Pi m_j$ is symmetric about $d_j=\frac{1}{2}$ with respect to the time ratio $d_j$.

The amplitude $\Pi m_j$ differs depending on the phase of the signal wave drecb. Therefore, the amplitude $\Pi 0$, which is the average value thereof, is expressed by Math. (13) similar to Math. (12) using an average value $d^\wedge$ of the time ratio $d_j$ in one cycle of the signal wave drech.

[Math. 13]

$$\pi 0 = (2/\pi)\sin(d^\wedge \cdot \pi) \tag{13}$$

However, due to the symmetry of the amplitude $\Pi m_j$ with respect to the time ratio $d_j$ as described above, the value $(1-d_j)$ is used instead of the time ratio $d_j$ in $\frac{1}{2}\leq d_j\leq 1$ when calculating the average value $d^\wedge$.

The signal wave drecb is a sinusoidal wave, and its waveform J satisfies Math. (14) by introducing the phase $\theta$.

[Math. 14]

$$J(\theta) = ks \cdot \sin(\theta) \tag{14}$$

FIG. 22 is a graph illustrating the relationship between the phase of the signal wave drecb and the time ratio $d_j$ or the value $(1-d_j)$ with the modulation factor ks as a parameter. In the graph, when the time ratio $d_j$ is $\frac{1}{2}$ or more, the value $(1-d_j)$ is illustrated instead of the time ratio $d_j$.

Curves G71, G72, G73, G74, G75, G76, and G77 represent the cases in which the modulation factor ks has a value of 0.2, 0.4, 0.5, q1, q2, q3, and 1, respectively. Here, q1=$\sqrt{2}$/(1+$\sqrt{3}$), q2=1/$\sqrt{3}$, and q3=1/$\sqrt{2}$.

The phase $\Theta$ (0<$\Theta$<$\Pi/2$) of the signal wave drecb when the time ratio $d_j$ has a value of $\frac{1}{2}$ is introduced. When the modulation factor ks is less than $\frac{1}{2}$, the phase @ does not exist, and as the modulation factor ks is larger than $\frac{1}{2}$, the phase $\Theta$ is smaller.

When the case of $\theta=\Theta$ is considered, Math. (15) is established.

[Math. 15]

$$ks = (1/2)/\sin(\Theta) \tag{15}$$

The curves G71, G72 do not have a value of $\frac{1}{2}$ and the phase @ does not exist. For the curve G73, $\Theta$=90 degrees. For the curve G74, $\Theta$=75 degrees. For the curve G75, $\Theta$=60 degrees. For the curve G76, $\theta$=45 degrees. For the curve G77, $\Theta$=30 degrees (see Math. (15)).

FIG. 23 is a graph illustrating the relationship between the phase of the signal wave drecb and the time ratio $d_j$ or the value $(1-d_j)$ in the case of $\Theta=\pi/3$ (60 degrees) (the curve G75 also illustrated in FIG. 22 is reproduced). The signal wave drecb is a sinusoidal wave, and the average value $d^\wedge$ is obtained by obtaining an integral value of the time ratio $d_j$ or the value $(1-d_j)$ in the phases 0 to $\Pi/2$ from the symmetry thereof and dividing the integral value by $\Pi/2$.

The average value $d^\wedge$ is obtained by Math. (16) on the basis of the above integral value.

[Math. 16]

$$d^\wedge = (2/\pi)\{((1/2)/\sin(\Theta)) \cdot (1 - 2\cos(\Theta)) + (\pi/2 - \Theta)\} \tag{16}$$

The phase $\Theta$ that maximizes the average value $d^\wedge$ is the phase $\Theta$ (<$\Pi/2$) that becomes 0 when Math. (16) is differentiated with respect to the phase $\Theta$. The differential with respect to the phase $\Theta$ is represented by the symbol $\Delta/\Delta\Theta$, and Math. (17) is obtained.

[Math. 17]

$$\Delta d^\wedge/\Delta\Theta = (1/2)(-\cos(\Theta)/\sin^2(\Theta))(1 - 2\cos(\Theta)) \tag{17}$$

From Math. (17), the phase $\Theta$ that maximizes the average value $d^\wedge$ is $\Pi/3$, and the modulation factor ks corresponding thereto is 1/$\sqrt{3}$ (see Math. (16)).

The fact that the phase $\Theta$(<$\Pi/2$) that maximizes the average value $d^\wedge$ maximizes the value $\sin(d^\wedge\cdot\Pi)$ is clear from the fact that the relationship illustrated for the carrier cycle in FIG. 21 is established as the relationship between the time ratio and the pulse width regardless of the size of the cycle. Therefore, the amplitude $\Pi 0$ expressed by Math. (13) also becomes maximum at $\Theta=\pi/3$, and the harmonic amplitude Ih has a maximum value at the modulation factor ks=1/$\sqrt{3}$ (see Math. (10)).

As is understood from the above description, the modulation factor ks (=1/$\sqrt{3}$) that gives the maximum value of the harmonic amplitude Ih does not depend on the boost ratio $\alpha$. However, since there is the relationship of R=ks+(1−ks)$\alpha$ when the equivalent direct-current voltage Vdc is constant regardless of the phase ot, the voltage utilization ratio R that gives the maximum value of the harmonic amplitude Ih increases with an increase in the boost ratio $\alpha$. This appears in FIG. 16 in that the value of the voltage utilization ratio R that gives the local maximum value of the polygonal line G52 is more than the value of the voltage utilization ratio R that gives the local maximum value of the polygonal line G51.

The duty drec coincides with the modulation factor ks at $\theta=\Pi/2$ and has the maximum value. It is desirable that the maximum value of the duty drec be less than 1/$\sqrt{3}$ or more than $1/\sqrt{3}$ and equal to or less than 1 from the viewpoint of reducing the harmonic amplitude Ih regardless of the value of the boost ratio $\alpha$.

When the duty dz in the boost control is 0, it is desirable that the maximum value of the value obtained by subtracting the duty dc from 1 be more than 0 and less than $1/\sqrt{3}$, or more than $1/\sqrt{3}$ and equal to or less than 1.

It is desirable that the maximum value of the duty drec be less than $1/\sqrt{3}$ from the viewpoint of increasing the equivalent direct-current voltage Vdc. It is desirable that the maximum value of the duty drec be more than $1/\sqrt{3}$ and equal to or less than 1 from the viewpoint of improving the efficiency of the power converter 100.

Such selection of the duties drec, dc is the same not only from the viewpoint of a reduction in the harmonic amplitude Ih but also from the viewpoint of a reduction in the harmonic amplitude Ih'. As a matter of course, according to Math. (7), the voltage utilization ratio R that gives the local maximum value of the harmonic amplitude Ih' at the certain boost ratio $\alpha$ is more than the voltage utilization ratio R that gives the local maximum value of the harmonic amplitude Ih at the same boost ratio $\alpha$. However, for example, the increase rate of the value of the harmonic amplitude Th' when the duty drec has a value of 0.6 ($>1/\sqrt{3}$) with respect to the value of the harmonic amplitude Ih when the duty drec has a value of $1/\sqrt{3}$ is less than 1%, and such an increase rate can be ignored in the actual control.

Referring to FIGS. 17 and 19, it is understood that all of the first control, the second control, the fifth control, the sixth control, and the seventh control correspond to the case where the maximum value of the duty drec is less than $1/\sqrt{3}$. Similarly, it is understood that both of the third control and the fourth control correspond to the case where the maximum value of the duty drec is more than $1/\sqrt{3}$ and equal to or less than 1.

D. Function and Arrangement of Filter 2

The filter 2 may be provided closer to the single-phase alternating-current power source 1 than the converter 3 with respect to the single-phase alternating-current power source 1. For example, the reactor L2 is provided between one of the two output ends of the single-phase alternating-current power source 1 and the converter 3. The capacitor C2 is connected in series to the reactor L2 between the two output ends of the single-phase alternating-current power source 1.

FIG. 24 is a circuit diagram partially illustrating the power converter 100 when the filter 2 is arranged as described above. The configuration of the power converter 100 is the same as the configuration illustrated in FIG. 1 except for the arrangement of the filter 2.

Referring to FIG. 18, the frequency of the carrier C3 is employed as the fundamental frequency at which the boost chopper of the booster 4b executes chopping of the current iL. Further, the inverter-side carrier frequency is the frequency of the carrier C1. For example, the frequency of the carrier C3 is set higher than the frequency of the carrier C1. In the switching circuit 4a, the frequency of the carrier C1 is used as the fundamental frequency at which the transistor Qc is switched.

The fact that the cutoff frequency of the filter 2 is lower than the frequency of the carrier C1 contributes to preventing not only the ripple current caused by the switching of the inverter 5 but also one or both of the ripple current caused by the switching in the switching circuit 4a and the ripple current caused by the switching in the booster 4b from propagating to the single-phase alternating-current power source 1. Such a contribution does not depend on whether the filter 2 is arranged as illustrated in FIG. 1 or FIG. 24.

While the embodiments have been described above, it will be understood that various changes in form and detail may be made therein without departing from the spirit and scope of the claims. The various embodiments and modifications described above can be combined with each other.

REFERENCE SIGNS LIST

2 FILTER
3 CONVERTER
4 ACTIVE BUFFER
4a SWITCHING CIRCUIT
4b BOOSTER
5 INVERTER
7 DIRECT-CURRENT LINK
100 POWER CONVERTER
Idc DIRECT CURRENT
Ih' AMPLITUDE
J1, J2 RANGE
J1d, J2d LOWER LIMIT
J1u, J2u UPPER LIMIT
PL, Pbuf, Pc, Pdc, Pin, Pout, Prec INSTANTANEOUS POWER
Qc TRANSISTOR
R VOLTAGE UTILIZATION RATIO
Sc SWITCH
TH1, TH2, TH3 THRESHOLD
Vc CAPACITOR VOLTAGE
Vdc EQUIVALENT DIRECT-CURRENT VOLTAGE
Vin ALTERNATING-CURRENT VOLTAGE
Vm PEAK VALUE
Vrec RECTIFIED VOLTAGE
d1, d1a, d1b, d2 LOWER LIMIT VALUE
dc, drec DUTY
iL CURRENT
$\alpha$ BOOST RATIO
$\alpha$1, $\alpha$1a, $\alpha$1b, $\alpha$2 VALUE

The invention claimed is:

1. A method for controlling a power converter, the power converter including:

a direct-current link;

a converter that rectifies a single-phase alternating-current voltage, converts a first alternating-current power based on the alternating-current voltage into a direct-current power, and output a first instantaneous power;

an active buffer that exchanges power with the direct-current link and buffers the power at a second instantaneous power; and an inverter that converts a third instantaneous power input from the direct-current link into a second alternating-current power and outputs the second alternating-current power, the active buffer includes a booster that boosts a rectified voltage obtained by rectifying the alternating-current voltage to generate a first voltage; and a switch that intermittently applies the first voltage from the booster to the direct-current link, the method comprising:

bringing the switch into conduction with a first duty;

by controlling one or both of the first duty and the first voltage:

controlling an equivalent direct-current voltage to be more than a peak value of the rectified voltage and equal to or less than the first voltage when the second alternating-current power is equal to or more than a second threshold less than a first threshold; and setting the equivalent direct-current voltage when the second alternating-current power has a first value more than the first threshold to be higher than the equivalent direct-current voltage when the second alternating-current power has a second value more than the second threshold and less than the first threshold, wherein the equivalent direct-current voltage is a direct-current voltage applied to the direct-current link and obtained by dividing the third instantaneous power by a direct current which is an average value of a current flowing through the inverter.

2. The method for controlling the power converter according to claim 1, comprising, by the active buffer, receiving a fourth instantaneous power that is a part of the first instantaneous power from the direct-current link, outputting a fifth instantaneous power to the direct-current link, and buffering the second instantaneous power, wherein the third instantaneous power is a sum of the fifth instantaneous power and a sixth instantaneous power obtained by subtracting the fourth instantaneous power from the first instantaneous power, wherein a power ratio is a ratio of the sixth instantaneous power to the first instantaneous power, and the method comprising setting the power ratio when the second alternating-current power has the first value to be less than the power ratio when the second alternating-current power has the second value.

3. The method for controlling the power converter according to claim 1, wherein when the second alternating-current power is more than the second threshold, a maximum value of a second duty, which is a value obtained by subtracting the first duty from 1, is more than 0 and less than $1/\sqrt{3}$, or more than $1/\sqrt{3}$ and equal to or less than 1.

4. The method for controlling the power converter according to claim 3, wherein when the second alternating-current power is more than the second threshold, a maximum value of the second duty is more than 0 and less than $1/\sqrt{3}$.

5. The method for controlling the power converter according to claim 4, wherein a boost ratio is a value obtained by dividing the first voltage by the peak value, a voltage utilization ratio is a value obtained by dividing the equivalent direct-current voltage by the peak value, the boost ratio is able to have any of a third value and a fourth value more than the third value, in a case where the second alternating-current power is more than the second threshold:

when the boost ratio has the third value, an amplitude of a harmonic for the alternating-current voltage due to switching of the switch is equal to or more than a predetermined threshold with respect to the voltage utilization ratio within a first range more than 1, and the amplitude of the harmonic is less than the predetermined threshold with respect to the voltage utilization ratio outside the first range;

when the boost ratio has the fourth value, the amplitude of the harmonic is equal to or more than the predetermined threshold with respect to the voltage utilization ratios within a second range more than 1, and the amplitude of the harmonic is less than the predetermined threshold with respect to the voltage utilization ratio outside the second range; and the fourth value is adopted as the boost ratio when the voltage utilization ratio is more than an upper limit of the second range.

6. The method for controlling the power converter according to claim 4, wherein a boost ratio is a value obtained by dividing the first voltage by the peak value, a voltage utilization ratio is a value obtained by dividing the equivalent direct-current voltage by the peak value, the boost ratio is able to have any of a third value and a fourth value more than the third value, in a case where the second alternating-current power is more than the second threshold:

when the boost ratio has the third value, an amplitude of a harmonic for the alternating-current voltage due to switching of the switch is equal to or more than a predetermined threshold with respect to the voltage utilization ratio within a first range more than 1, and the amplitude of the harmonic is less than the predetermined threshold with respect to the voltage utilization ratio outside the first range;

when the boost ratio has the fourth value, the amplitude of the harmonic is equal to or more than the predetermined threshold with respect to the voltage utilization ratio within a second range more than 1, and the amplitude of the harmonic is less than the predetermined threshold with respect to the voltage utilization ratio outside the second range; and the third value is adopted as the boost ratio when the voltage utilization ratio is more than an upper limit of the first range and equal to or less than an upper limit of the second range.

7. The method for controlling the power converter according to claim 4, wherein a boost ratio is a value obtained by dividing the first voltage by the peak value, a voltage utilization ratio is a value obtained by dividing the equivalent direct-current voltage by the peak value, the boost ratio is able to have any of a third value and a fourth value more than the third value, in a case where the second alternating-current power is more than the second threshold:

when the boost ratio has the third value, an amplitude of a harmonic for the alternating-current voltage due to switching of the switch is equal to or more than a predetermined threshold with respect to the voltage utilization ratio equal to or less than a first lower limit value more than 1, and the amplitude of the harmonic is less than the predetermined threshold with respect to the voltage utilization ratio more than the first lower limit value;

when the boost ratio has the fourth value, the amplitude of the harmonic is equal to or more than the predetermined threshold with respect to the voltage utilization ratio equal to or less than a second lower limit value higher than the first lower limit value, and the amplitude of the harmonic is less than the predetermined threshold with respect to the voltage utilization ratio more than the second lower limit value;

when the third value is equal to or more than the second lower limit value, the third value is adopted as the boost ratio when the voltage utilization ratio is more than the first lower limit value and less than the second lower limit value; and when the third value is less than the second lower limit value, the third value is adopted as the boost ratio when the voltage utilization ratio is more than the first lower limit value and less than the third value.

8. The method for controlling the power converter according to claim 7, wherein when the third value is equal to or more than the second lower limit value, the fourth value is adopted as the boost ratio when the voltage utilization ratio is more than the second lower limit value.

9. The method for controlling the power converter according to claim 3, wherein when the second alternating-current power is more than the second threshold, a maximum value of the second duty is more than $1/\sqrt{3}$ and equal to or less than 1.

10. The method for controlling the power converter according to claim 9, wherein a boost ratio is a value obtained by dividing the first voltage by the peak value, a voltage utilization ratio is a value obtained by dividing the equivalent direct-current voltage by the peak value, the boost ratio is able to have any of a third value and a fourth value more than the third value, in a case where the second alternating-current power is more than the second threshold:

when the boost ratio has the third value, an amplitude of a harmonic for the alternating-current voltage due to switching of the switch is equal to or more than a predetermined threshold with respect to the voltage utilization ratio within a first range more than 1, and the amplitude of the harmonic is less than the predetermined threshold with respect to the voltage utilization ratio outside the first range;

when the boost ratio has the fourth value, the amplitude of the harmonic is equal to or more than the predetermined threshold with respect to the voltage utilization ratio within a second range more than 1, and the amplitude of the harmonic is less than the predetermined threshold with respect to the voltage utilization ratio outside the second range; and the fourth value is adopted as the boost ratio when the voltage utilization ratio is equal to or more than a lower limit of the first range and is less than a lower limit of the second range.

11. The method for controlling the power converter according to claim 9, wherein a boost ratio is a value obtained by dividing the first voltage by the peak value, a voltage utilization ratio is a value obtained by dividing the equivalent direct-current voltage by the peak value, the boost ratio is able to have any of a third value and a fourth value more than the third value, in a case where the second alternating-current power is more than the second threshold:

when the boost ratio has the third value, an amplitude of a harmonic for the alternating-current voltage due to switching of the switch is equal to or more than a predetermined threshold with respect to the voltage utilization ratio within a first range more than 1, and the amplitude of the harmonic is less than the predetermined threshold with respect to the voltage utilization ratio outside the first range;

when the boost ratio has the fourth value, the amplitude of the harmonic is equal to or more than the predetermined threshold with respect to the voltage utilization ratio within a second range more than 1, and the amplitude of the harmonic is less than the predetermined threshold with respect to the voltage utilization ratio outside the second range;

when the first duty has a fifth value and the boost ratio has the fourth value, the voltage utilization ratio has a lower limit of the first range, and when the voltage utilization ratio is less than a lower limit of the first range, a value less than the fifth value is adopted as the first duty, and the third value is adopted as the boost ratio.

12. The method for controlling the power converter according to claim 1, wherein the booster includes a boost chopper, and the method comprising causing the boost chopper to execute chopping of a current to be input to the boost chopper by using a frequency higher than a frequency of a carrier used for switching of the inverter.

13. The method for controlling the power converter according to claim 12, wherein the power converter further includes a filter having a cutoff frequency lower than the frequency of the carrier, the method comprising inputting the alternating-current voltage to the converter via the filter.

14. The method for controlling the power converter according to claim 12, wherein the power converter further includes a filter having a cutoff frequency lower than the frequency of the carrier, and the method comprising outputting the first instantaneous power from the converter via the filter.

15. The method for controlling the power converter according to claim 1, wherein the booster includes a boost chopper, the method comprising causing the boost chopper to execute chopping of a current to be input to the boost chopper by using a frequency higher than a frequency at which the switch performs switching.

16. The method for controlling the power converter according to claim 15, wherein the power converter further includes a filter having a cutoff frequency lower than the frequency at which the switch performs switching, the method comprising inputting the alternating-current voltage to the converter via the filter.

17. The method for controlling the power converter according to claim 15, wherein the power converter further includes a filter having a cutoff frequency lower than the frequency at which the switch performs switching, the method comprising outputting the first instantaneous power from the converter via the filter.

18. The method for controlling the power converter according to claim 1, the method comprising, by controlling the first duty, when the second alternating-current power is less than the second threshold:

adopting any one of;

performing control to alternately provide a non-conduction period in which the first duty is 0 and a conduction period in which the first duty is positive; and performing another control in which a length of the non-conduction period is substantially 0.

* * * * *